(12) United States Patent
Sugihara et al.

(10) Patent No.: US 11,841,332 B2
(45) Date of Patent: Dec. 12, 2023

(54) INSPECTION METHOD AND MANUFACTURING METHOD FOR STRUCTURE AND INSPECTION APPARATUS AND MANUFACTURING APPARATUS FOR STRUCTURE

(71) Applicant: Toray Industries, Inc., Tokyo (JP)

(72) Inventors: Hiroki Sugihara, Otsu (JP); Takahiro Tanino, Otsu (JP)

(73) Assignee: Toray Industries, Inc., Tokyo (JP)

( * ) Notice: Subject to any disclaimer, the term of this patent is extended or adjusted under 35 U.S.C. 154(b) by 346 days.

(21) Appl. No.: 17/417,197

(22) PCT Filed: Dec. 19, 2019

(86) PCT No.: PCT/JP2019/049802
§ 371 (c)(1),
(2) Date: Jun. 22, 2021

(87) PCT Pub. No.: WO2020/153063
PCT Pub. Date: Jul. 30, 2020

(65) Prior Publication Data
US 2022/0057342 A1  Feb. 24, 2022

(30) Foreign Application Priority Data
Jan. 25, 2019 (JP) ................................. 2019-010819

(51) Int. Cl.
| | |
|---|---|
| *G01N 23/18* | (2018.01) |
| *G01B 11/06* | (2006.01) |
| *G01N 23/04* | (2018.01) |
| *G01N 23/083* | (2018.01) |
| *B60K 15/03* | (2006.01) |

(52) U.S. Cl.
CPC ......... *G01N 23/18* (2013.01); *G01B 11/0608* (2013.01); *G01N 23/04* (2013.01);
(Continued)

(58) Field of Classification Search
CPC ...... G01N 23/18; G01N 23/04; G01N 23/083; G01N 2223/04; G01N 2223/401;
(Continued)

(56) References Cited

U.S. PATENT DOCUMENTS

| | | | |
|---|---|---|---|
| 7,974,379 | B1 | 7/2011 | Case et al. |
| 9,470,366 | B2 | 10/2016 | Dullaert et al. |

(Continued)

FOREIGN PATENT DOCUMENTS

| | | | |
|---|---|---|---|
| EP | 3702765 | A1 | 9/2020 |
| JP | 049606 | A | 1/1992 |

(Continued)

OTHER PUBLICATIONS

International Search Report and Written Opinion for International Application No. PCT/JP2019/049802, dated Mar. 17, 2020, with partial English translation, 5 pages.

*Primary Examiner* — Kiho Kim
(74) *Attorney, Agent, or Firm* — RatnerPrestia

(57) ABSTRACT

An inspection apparatus and method are described for detecting, with high accuracy, whether a structure contains defects, where the inspection apparatus comprises: an X-ray emitting means (1a, 1b) for emitting X-rays through two or more paths; one or more X-ray detection means (3) for detecting the X-rays passing through the a structure (2); a multiple position distance measurement means (4) for measuring the distance from the X-ray emitting means to the structure at a plurality of positions; and an image processing means (5).

20 Claims, 24 Drawing Sheets

(52) U.S. Cl.
CPC .......... *G01N 23/083* (2013.01); *B60K 15/03* (2013.01); *B60K 2015/03315* (2013.01); *G01N 2223/04* (2013.01); *G01N 2223/401* (2013.01); *G01N 2223/646* (2013.01)

(58) Field of Classification Search
CPC ..... G01N 2223/646; G01N 2223/1016; G01N 2223/3308; G01N 2223/629; G01N 23/087; G01B 11/0608; G01B 11/2518; G01B 15/00; G01B 21/20; B60K 15/03; B60K 2015/03315; G06T 7/0004; G06T 2207/10012; G06T 2207/10116; Y02E 60/50; Y02P 70/50

See application file for complete search history.

(56) References Cited

U.S. PATENT DOCUMENTS

| | | | |
|---|---|---|---|
| 10,388,028 | B2 * | 8/2019 | Ma .................... G06T 7/136 |
| 2002/0088806 | A1 | 7/2002 | Takaku et al. |
| 2011/0299653 | A1 | 12/2011 | Mishra et al. |

FOREIGN PATENT DOCUMENTS

| | | |
|---|---|---|
| JP | 2003240736 A | 8/2003 |
| JP | 2010281648 A | 12/2010 |
| JP | 2014501818 A | 1/2014 |
| JP | 2014157136 A | 8/2014 |
| JP | 2014190701 A | 10/2014 |

\* cited by examiner

INSPECTION METHOD AND MANUFACTURING METHOD FOR STRUCTURE AND INSPECTION APPARATUS AND MANUFACTURING APPARATUS FOR STRUCTURE

CROSS REFERENCE TO RELATED APPLICATIONS

This is the U.S. National Phase application of PCT/JP2019/049802, filed Dec. 19, 2019, which claims priority to Japanese Patent Application No. 2019-010819, filed Jan. 25, 2019, the disclosures of each of these applications being incorporated herein by reference in their entireties for all purposes.

FIELD OF THE INVENTION

The present invention relates to an inspection method and a production method for structural members, an inspection apparatus and a production apparatus for structural members, and a production method and a production apparatus for high pressure tanks, all serving for high accuracy determination of whether structural members are acceptable or unacceptable, and also relates to structural members, high pressure tanks, and fuel cell vehicles.

BACKGROUND OF THE INVENTION

In recent years, fuel cell vehicles have attracted attention as a solution to the depletion of petroleum fuels and the reduction of harmful gas emissions. A fuel cell vehicle incorporates, for example, a fuel cell that generates electricity through electrochemical reaction of hydrogen and oxygen that exists in the air, and supplies the electricity generated by the fuel cell to a motor to provide a driving force. When the fuel cell is a hydrogen cell, the automobile is equipped with a high pressure tank to contain hydrogen. For example, such a high pressure tank is composed mainly of a liner member made of resin and a fiber reinforced resin layer that covers the outside surface of the liner member. The liner member is made of resin, metal such as aluminum and iron, or the like. In particular, active efforts have been focused on liner members made of resin because of being light in weight and high in moldability to permit inexpensive production.

PATENT DOCUMENTS

Patent document 1: Published Japanese Translation of PCT International Publication JP 2014-501818
Patent document 2: Japanese Unexamined Patent Publication (Kokai) No. HEI 4-9606

SUMMARY OF THE INVENTION

However, a high pressure tank manufactured using the molded article described in Patent document 1 may suffer from deformation or the like when filling and releasing of high pressure gas (high pressure hydrogen gas in particular) is repeated, and this has often been a cause of deterioration in reliability. The cause of such a sudden abnormality is usually unknown with no inspection methods available.

Thus, as a result of intensive studies aiming to solve the above-mentioned problems, the present inventors have found that deformation or the like of such a tank are attributable to, for example, impurities and voids that exist in a portion where two structural members that are prepared separately are joined. In the case of adopting a welding-based joining method that is commonly used for joining structural members, a step of thrusting the joint portion is necessary in order to ensure sufficient welding. In this step, a swell of molten structural members (hereinafter referred to as fin) is formed in the joint portion. Voids and impurities in the fin do not cause deformation or the like of the structural members. However, as in the inspection method described in Patent document 2, the inspection of the interior of a structural member has been commonly performed by applying X-ray beam and determining whether there exist internal impurities or voids based on changes in the amount of X-ray transmitted. Practical setups for implementing this are illustrated in FIG. 23 and FIG. 24. FIG. 23 shows an inspection setup based on general type X-ray transmission imaging and contains an X-ray emission means 1, a structural member 2 to be inspected, and an X-ray detection means 3. FIG. 24 is a schematic diagram for explaining a typical defect portion and a non-defect portion that cannot be distinguished by the inspection setup shown in FIG. 23, which is based on general type X-ray transmission imaging. To simplify the description, FIG. 24 shows only the cross section of the joint portion of the structural member 2 located nearer to the X-ray emission means 1. In this setup, the X-ray beam emitted from the X-ray emission means 1 passes through both the joint portion to be inspected and the fin portion and accordingly, it is difficult to determine whether a change in transmission of X-ray emitted from the X-ray emission means 1 is attributed to voids or impurities in the joint portion or to voids or impurities in the fin portion. In addition, the use of X-ray beams emitted in a plurality of directions is often practiced to identify a position where a defect occurs, but it is also difficult to determine whether the portion is a fin portion or a joint portion from the position where the defect occurs.

The present invention was made in view of such conventional problems, and an object thereof is to provide an inspection method and a production method for structural members, an inspection apparatus and a production apparatus for structural members, and a production method and a production apparatus for high pressure tanks, all serving for high accuracy inspection of structural members to determine whether they are acceptable or unacceptable and for detection of structural members that are likely to undergo deformation or the like in the future, and also provide structural members, high pressure tanks, and fuel cell vehicles.

Thus, the inspection apparatus for structural members according to an embodiment of the present invention that is designed for solving the above problems includes an X-ray emission means for emitting X-ray beams through two or more paths, one or more X-ray detection means for detecting X-ray beams that have passed through a structural member, a multiple position distance measurement means for measuring the distance from the X-ray emission means to the structural member at a plurality of positions, and an image processing means, wherein the image processing means includes a defect candidate detection means for detecting a defect candidate based on two or more images acquired by the X-ray detection means, a height measurement means, an image computation means for performing logical multiplication of the image having recorded height position information acquired by the height measurement means and a defect candidate image acquired by the defect candidate detection means, an inspection region setting means for setting an inspection region based on the distance and the thickness of the structural member, and a defect identification means for identifying a defect when the inspection region contains a defect candidate.

It is also preferable for the multiple position distance measurement means included in the inspection apparatus for structural members according to the present invention to be a height measurement means for measuring the linear height profile by the optical cutting method.

It is also preferable for the height measurement means included in the inspection apparatus for structural members according to the present invention to be a stereo matching type one.

It is also preferable for the inspection region setting means included in the inspection apparatus for structural members according to the present invention to be designed to determine the surface profile of the structural member from the aforementioned plurality of distance values and set an inspection region at each inspection position along the circumferential direction based on the aforementioned thickness of the structural member.

It is also preferable for the structural member under inspection by the inspection apparatus for structural members according to the present invention to have a substantially tubular shape having a surface profile as estimated from the center position and the radius of the arc of the structural member calculated from the plurality of distance values.

It is also preferable for the structural member under inspection by the inspection apparatus for structural members according to the present invention to be a member of a high pressure tank.

In addition, the production apparatus for structural members according to an embodiment of the present invention is characterized by including an inspection means containing the aforementioned inspection apparatus for structural members and a sorting means designed to distinguish between a structural member judged to be unacceptable and a structural member judged to be acceptable by the inspection means.

Furthermore, the production apparatus for high pressure tanks according to an embodiment of the present invention is characterized by including an inspection means containing the aforementioned inspection apparatus for structural members, a sorting means designed to distinguish between a structural member judged to be unacceptable and a structural member judged to be acceptable by the inspection means, and an outer layer formation means for forming an outer layer for reinforcement on the structural member judged to be acceptable.

In addition, the inspection method for structural members according to an embodiment of the present invention, which is designed to solve the above problems, is characterized by emitting X-ray beams through two or more paths, detecting X-ray beams that have passed through a structural member at one or more positions, measuring the distance from the X-ray emission means to the structural member at a plurality of positions, detecting a defect candidate based on observed X-ray images, measuring the height of the defect candidate, performing logical multiplication of the observed height information image and the image obtained as defect candidate, setting an inspection region based on the distance and the thickness of the structural member, and identifying a defect when the inspection region contains a defect candidate.

It is also preferable for the distance measurement method included in the inspection method for structural members according to the present invention to be designed to measure the linear height profile by the optical cutting method.

It is also preferable for the method for measuring the height of a defect candidate included in the inspection method for structural members according to the present invention to be a stereo matching type one.

It is also preferable for the inspection region setting method included in the inspection method for structural members according to the present invention to be designed to determine the surface profile of the structural member from the aforementioned plurality of distance values and set an inspection region at each inspection position on the basis of the aforementioned thickness of the structural member.

For the surface profile determination method included in the inspection method for structural members according to the present invention, it is also preferable for the structure to have a substantially tubular shape having a surface profile as estimated from the center position and the radius of the arc of the structural member calculated from the plurality of distance values.

It is also preferable for the structural member under inspection by the inspection method for structural members according to the present invention to be a member of a high pressure tank.

In addition, the production method for structural members according to an embodiment of the present invention is characterized by including an inspection step using the inspection method for structural members and a sorting step for distinguishing between a structural member judged to be unacceptable and a structural member judged to be acceptable in the inspection step.

Furthermore, the production method for high pressure tanks according to an embodiment of the present invention is characterized by including an inspection step using the inspection method for structural members, a sorting step for distinguishing between a structural member judged to be unacceptable and a structural member judged to be acceptable in the inspection step, and an outer layer forming step for forming an outer layer for reinforcement on the structural member judged to be acceptable.

In addition, the production method for fuel cell vehicles according to an embodiment of the present invention is characterized by including an inspection step using the inspection method for structural members, a sorting step for distinguishing a structural member judged to be unacceptable and a structural member judged to be acceptable in the inspection step, an outer layer forming step for forming an outer layer for reinforcement on the structural member judged to be acceptable to produce a high pressure tank, and an installation step for installing the resulting high pressure tank on a chassis.

The present invention can provide an inspection method and a production method for structural members, an inspection apparatus and a production apparatus for structural members, and a production method and a production apparatus for high pressure tanks, all serving for high accuracy inspection of structural members to determine whether they are acceptable or unacceptable and for detection of structural members that are likely to undergo deformation or the like in the future, and also provide structural members, high pressure tanks, and fuel cell vehicles.

DETAILED DESCRIPTION OF EMBODIMENTS OF THE INVENTION

<Inspection Apparatus for Structural Members>

Figure 1:
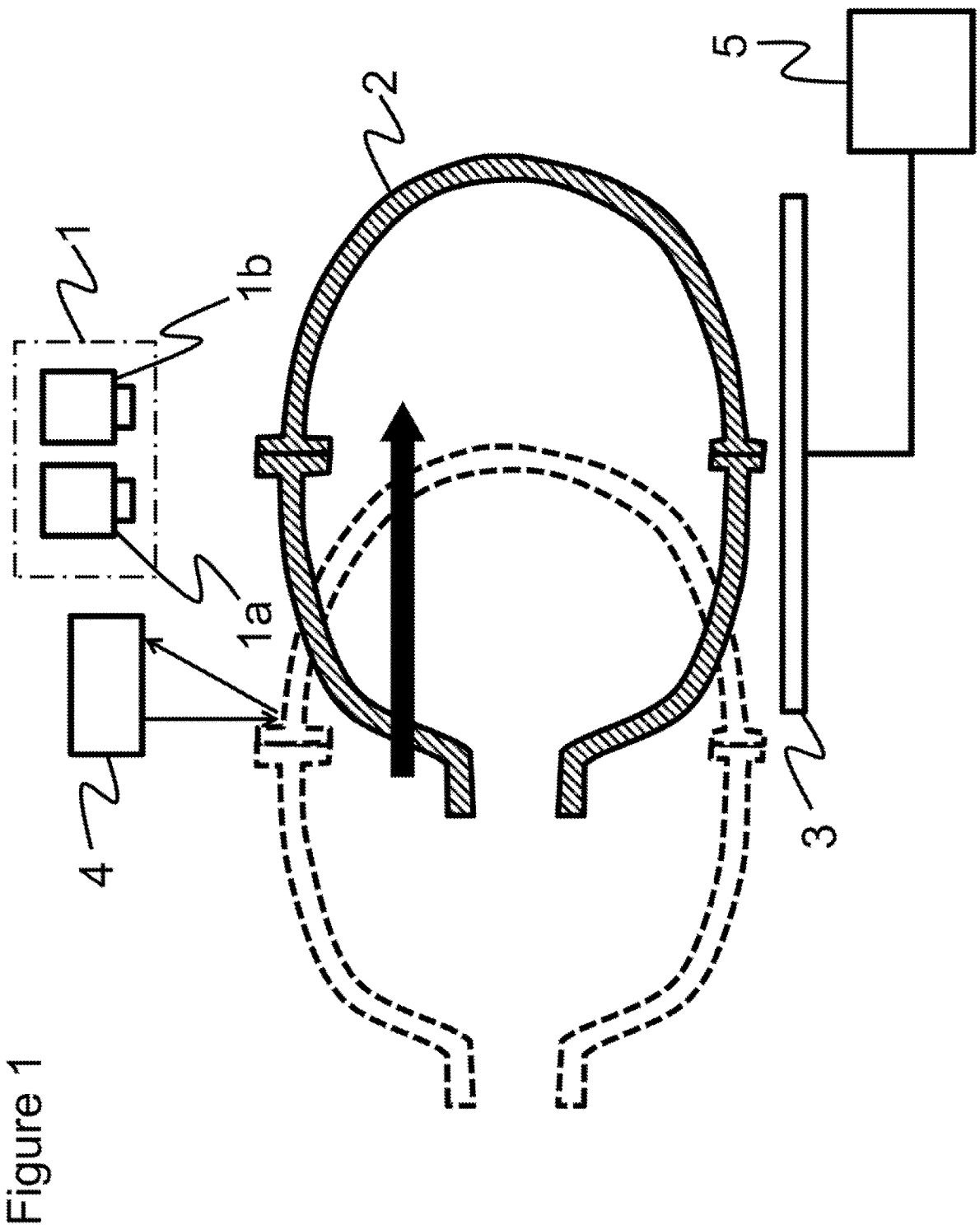
FIG. 1 is a schematic diagram for explaining an embodiment of the present invention.

The embodiments in which the inspection apparatus for structural members according to the present invention is applied will be described below with reference to the drawings. It should be understood, however, that the following embodiments only exemplify typical application of the present invention and the invention is not limited to these embodiments. The procedures described in the following examples may be modified in appropriate manners unless they depart from the spirit of this invention. In addition, the inspection apparatus for structural members according to the present invention can be applied to inspections of various structural members. They may include, for example, members of tubular high pressure tanks, resin pipes, and resin structural members. Here, as an example of inspection of structural members, the inspection of a liner member of a high pressure tank will be described in detail below.

First, an outline of a structural member and a high pressure tank to be inspected by a setup according to embodiments of the present invention will be described.

The high pressure tank is a container for storing high pressure gas such as compressed gas and liquefied gas, and in the case where the high pressure gas is hydrogen, for example, such containers include containers to be mounted on fuel cell automobiles, containers for high pressure hydrogen transport, and pressure accumulators for hydrogen fueling stations. There are no specific limitations on the structure of the high pressure tank. To give an example, a high pressure tank includes a liner member to serve as a member of the high pressure tank, one or a plurality of reinforcement layers covering the liner member, and a supply line (valve member, various piping lines, etc.) for supplying high pressure gas to the fuel cell.

There are no specific limitations on the shape of the high pressure tank. To give an example, the high pressure tank may be substantially tubular. The high pressure tank has an opening for filling the tank with high pressure gas or extracting the high pressure gas from the tank. The supply line works to close the opening. For the present invention, examples of the structural members include members of high pressure tanks such as a liner member and a combination of a liner member provided with a reinforcement layer formed thereon.

(Liner Member)

A liner member is a member of a tank container that constitutes a part of the housing of a high pressure tank. There are no specific limitations on the shape of the liner member. For example, the liner member has a substantially tubular shape and has an accommodation space formed therein. The accommodation space is to be filled with a high pressure gas. The liner member has an opening as described above. The liner member may be constituted of only one member, but is generally comprised of a plurality of divided members for ease of manufacture. In the latter case, the plurality of divided members can be integrated by joining or the like. Methods serving for producing a liner member include, for example, blow molding and injection molding. On the other hand, the inspection method according to embodiments of the present invention is suitably used for inspection of the joining face where the plurality of divided members is joined by injection molding to form a liner member.

There are no specific limitations on the material of the liner member. To give an example, a liner member is made of resin, metal such as aluminum and iron, or the like. In particular, a liner member made of resin that contains voids or impurities in a joint portion tends to easily undergo deformation, breakage, or the like after it is molded into a high pressure tank. However, the inspection method according to embodiments of the present invention serves appropriately to detect such voids and impurities. Therefore, the inspection method according to embodiments of the present invention is particularly suitable for liner members made of resin. Resins are so high in X-ray absorptivity that it is preferable for the liner member to contain at least one selected from the group consisting of polyolefin resins, ethylene-vinyl alcohol copolymers, and polyamide resins because impurities or the like in the liner member can be detected with higher accuracy by the X-ray detector that will be described later.

It is more preferable that the liner member contains a polyamide resin. Since the polyamide resin has a high X-ray absorptivity, voids, resin impurities, and the like in the polyamide resin can be detected easily. In particular, in the case where the high pressure gas is hydrogen gas, the hydrogen gas has a low molecular weight and therefore easily dissolves in the liner member. As a result, the high pressure tank for hydrogen gas is liable to be deformed or destroyed in the joint portion even when only a slight void or impurity exists in the joint portion of the liner member. The inspection method according to embodiments of the present invention serves for easy detection of such voids, resin impurities, and the like. Therefore, the inspection method according to embodiments of the present invention works suitably for accurate detection and appropriate identification of impurities and the like when the liner member is of polyamide resin.

(Reinforcement Layer)

It is preferable for the outer surface of the liner member to be covered with one or more reinforcement layers in order to reinforce the liner member. There are no specific limitations on the material of the reinforcement layers. To give an example, the reinforcement layer may be a fiber reinforced resin layer. Examples of the fiber reinforced resin to be used to form such a fiber reinforced resin layer include, for example, carbon fiber reinforced plastic (CFRP) and glass fiber reinforced plastic. Some of these fiber reinforced resins may be used in combination. The liner member may also be covered with two reinforcement layers made of different fiber reinforced resins. When the fiber reinforced resin is, for example, a carbon fiber reinforced plastic, the fiber reinforced resin layer is mainly composed of reinforcing fiber, such as carbon fiber reinforced plastic, used to wind around the outer surface of the liner member and a thermosetting resin used to bind reinforcing fibers to each other.

It is preferable for the inspection method according to the present invention to be performed to inspect the joining face of the liner member of a high pressure tank before a reinforcement layer is added. Specifically, in the inspection method, X-ray is emitted from an X-ray emission apparatus towards the liner member, and the X-ray beam that have passed through the liner member is detected using an X-ray detector, thereby determining whether the liner member is an acceptable one or an unacceptable one.

(Inspection Apparatus for Structural Members)

FIG. 1 is a schematic diagram for explaining the inspection apparatus according to an embodiment of the present invention.

(X-Ray Emission Means)

The X-ray emission means 1 is a device for emitting X-ray towards the structural member 2. There are no specific limitations on the shape and dimensions of the X-ray emission means 1. The X-ray emission means 1 may be provided with a power supply cable or the like (not shown in the figure) for driving the X-ray emission means. In this case, it is preferable for the power supply cable or the like to have a shape and dimensions that do not interfere with the structural member 2. The emitted X-ray beams need to reach the structural member through two or more paths. For the present invention, X-ray beams are emitted by two X-ray emission means, namely, X-ray emission means 1a and X-ray emission means 1b. The emitted X-ray beams pass through the structural member's half located nearer to the X-ray emission means and the other structural member's half located nearer to the X-ray detection means described later, and are detected by the X-ray detection means 3. Although any particular arrangement is specified for the X-ray emission means 1, it is preferable for at least one of the two or more of X-ray emission means to be located so as to prevent both the joining face near the X-ray emission means and the joining face near the X-ray detection means from being in the same transmission path. Here, the X-ray emission means 1a and the X-ray emission means 1b are arranged side by side so as to be disposed on either side of the joining faces of the structural member, and both of them are located so that neither of the joining face near the X-ray emission means nor the joining face near the X-ray detection means are in the same irradiation path.

(Structural Member)

The structural member 2 is illustrated as a member of a high pressure tank that is composed of two divided molded members joined together in a tubular shape.

(X-Ray Detection Means)

The X-ray emission means 3 is a device for detecting X-ray beams that have passed through the structural member 2. The X-ray detection means may have at least one or more X-ray detectors. In the case where only one X-ray detection means is used to detect X-ray beams emitted from two or more X-ray emission means 1, the two or more X-ray emission means may emit X-ray beams in different timings while X-ray detection means detect them. Alternatively, two or more X-ray detection means may be provided corresponding to the number of the two or more X-ray emission means 1 to detect X-ray beams simultaneously. Or, the position of the X-ray detection means may be shifted to where the X-ray beams emitted from two or more X-ray emission means can be detected by a single X-ray detection means. Generally, when voids exist, X-ray beams are detected more strongly than the surroundings because they are easy to penetrate, whereas when impurities exist, they are detected either strongly or weakly depending on the relationship between the specific gravity of the impurities and the specific gravity of the resin material constituting the structural member. In the case of a fin portion, the thickness is larger than that of the normal portion of the structural member, and accordingly, weaker X-ray beams are detected as a whole.

Here, the number "two or more" in the expression "an X-ray emission means for emitting X-ray beams through two or more paths" corresponds to the number "two or more" in the expression "two or more images acquired by the X-ray detection means" which will be described later. For definite explanation, the term "two or more" is used in the corresponding places to distinguish from the term "a plurality".

The X-ray detection means 3 may be a general purpose type X-ray detector. To give an example, the X-ray detection means 3 may be a direct conversion type X-ray detector or an indirect conversion type X-ray detector. More specifically, the X-ray detection means 3 may be an X-ray film, image intensifier, computed radiography (CR), flat panel detector (FPD), or the like.

With respect to the arrangement of the X-ray detecting elements in the X-ray detection means 3, the detecting elements may be arranged two-dimensionally to form an area sensor type X-ray detector or the detecting elements may be arranged one-dimensionally to form a line sensor type X-ray detector. The method for sequentially changing the inspection region may be optimized depending on which detection method is used. When the area sensor type is adopted, it may have a mechanism for sequentially switching the field of view in accordance with the inspection field of view of the area sensor, whereas when the line sensor type is adopted, it may have a mechanism for continuously moving the inspection field of view.

Here, it is preferable for the X-ray detection means 3 to be an indirect conversion type FPD in view of the fact that a development process or the like is unnecessary and accordingly the time required for inspection can be shortened as compared, for example, with the case where an X-ray film is used.

There are no restrictions in terms of usable temperature or the like on indirect conversion type FPDs as compared with direct conversion type detectors. Therefore, indirect conversion type X-ray detectors are high in handleability. Furthermore, it is preferable to use an indirect conversion type FPD having a cell scintillator. In an indirect conversion type FPD, a scintillator panel is used to convert radiation into visible light. The scintillator panel contains an X-ray phosphor such as cesium iodide (CsI), and after receiving emitted X-ray, the X-ray phosphor emits visible light correspondingly. Then the light is converted into electric signals by a TFT (thin film transistor), CCD (charge-coupled apparatus), or the like, thereby converting the X-ray information into digital image information. However, as the X-ray phosphor emits light in an indirect conversion type FPD, the visible light may be scattered by the phosphor itself, easily leading to images with decreased sharpness. On the other hand, in an FPD provided with a cell scintillator, the cells partitioned by partition walls are filled with a phosphor to suppress the influence of light scattering. As a result, the FPD provided with a cell scintillator is so high in sharpness that impurities and voids, if any, in the structural member 2 can be detected with high sensitivity.

It is more preferable for the X-ray detection means 3 to be a cell scintillator produced by processing partition walls containing glass as main component by photolithography using a photosensitive paste containing glass powder because this permits easy formation of a cell scintillator having a large area and a high sharpness. There are no specific restrictions on the pixel size of the sensor in the X-ray detection means 3. To give an example, the pixel size of the sensor is preferably 20 to 300 µm. When the pixel size is less than 20 µm, even minute impurities that do not contribute to deformation or destruction of the structural member 2 are likely to be detected, possibly allowing acceptable articles to be erroneously judged to be unacceptable. In addition, in the case of such a pixel size, image data will have a huge size, and the time required for signal reading and image processing will tend to become very long. On the other hand, when the pixel size is more than 300 µm, there is a possibility that impurities and the like cannot be sufficiently detected.

(Multiple Position Distance Measurement Means)

The multiple position distance measurement means 4 is intended to perform accurate determination of the surface position of the structural member 2. The multiple position distance measurement means 4 may be structured so that the measurement means or the structural member is moved to take measurements sequentially at constant intervals in a direction in which an increased number of measurements are desired or so that measurements can be taken simultaneously at multiple positions. Examples of the measurement means 4 include laser triangulation type displacement meter, laser interferometer, ultrasonic range finder, eddy current type displacement sensor, and stylus type displacement meter, of which the laser triangulation type displacement meter is preferred from the viewpoint of non-contact measurement, little influence by the material of the object under measurement, response speed, easiness of measurement at multiple positions, and the like. More specifically, the use of the so-called optical cutting method has been preferred. In the method, linear light beams produced by a laser light source etc. are applied to an object under measurement and the trajectories of reflected and scattered light beams are measured to determine the height profile.

Figure 2:
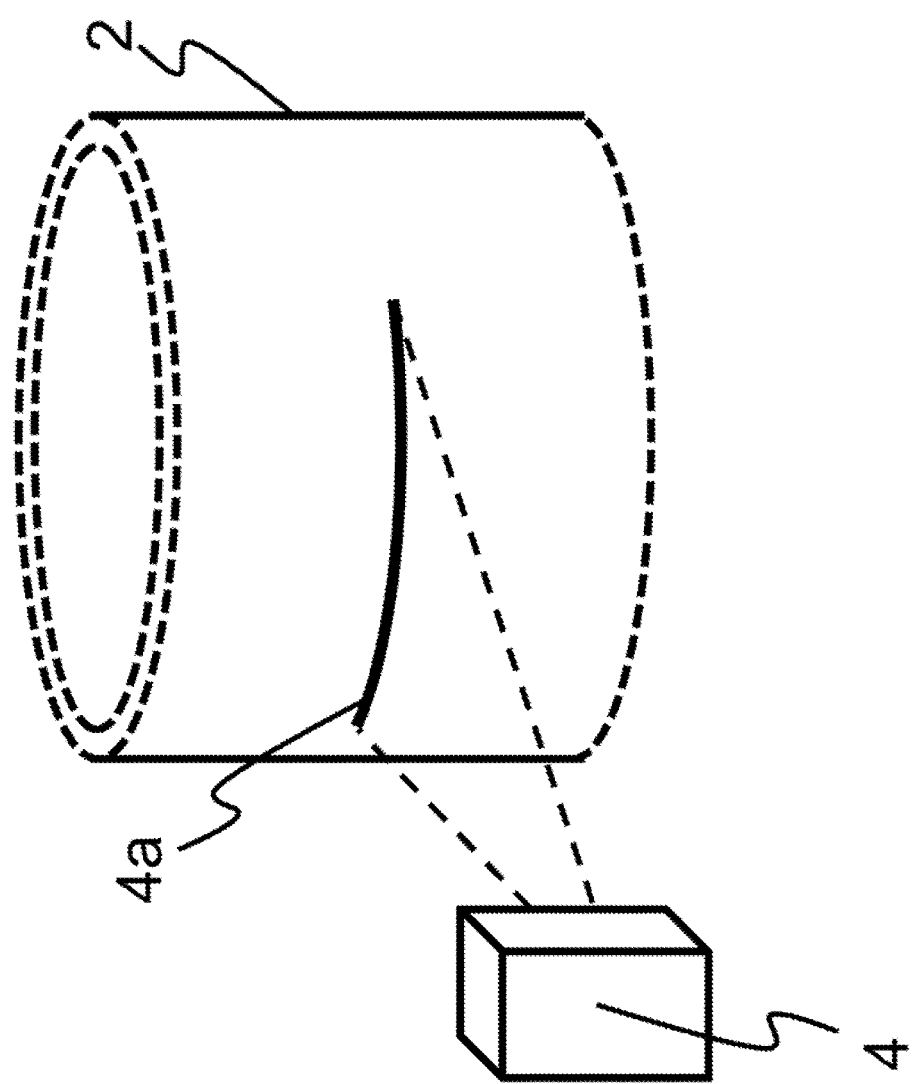
FIG. 2 is a schematic diagram showing the structure of a multiple position distance measurement means according to an embodiment of the present invention.

A specific example of a typical setup of the multiple position distance measurement means 4 is described in more detail below with reference to FIG. 2. FIG. 2 is a schematic diagram showing a setup of the multiple position distance measurement means 4. To simplify the description, only the multiple position distance measurement means 4 and the structural member 2 are shown. The multiple position distance measurement means 4 has, for example, a laser light source to produce a linear light beam and apply it to the tubular body of the structural member 2 in an arc-like direction. The linear light beam applied is reflected and scattered on the surface of the structural member 2 to give light trajectories that represent the surface profile of the structural member 2. The above light trajectories serve to show the distance measuring position 4a of the multiple position distance measurement means 4. The multiple position distance measurement means 4 has a light receiving means such as image sensor to measure the distance measure position 4a shown by the light trajectories and covert the measurements into numerical data that represent the surface profile of the structural member 2.

Here, the multiple position distance measurement means 4 may be located at any appropriate position as long as its relative distance relation with the X-ray emission means 1 is known. Accordingly, as illustrated in FIG. 1, the substantially tubular body of the structural member 2 may be moved in the tube's axis direction while performing multiple position distance measurement, thereby allowing the multiple position distance measurement means 4 to take required measurements, or alternatively, as seen from the schematic diagram given in FIG. 3, which shows the installation position for another setup of the multiple position distance measurement means 4, the X-ray emission means 1 and the multiple position distance measurement means 4 may be fixed at the position of the optical axis of the transmitted X-ray image. It is preferable that the multiple position distance measurement means 4 and the structural member 2 be disposed at appropriate positions so that the surface profile of the joint portion in the structural member 2 under inspection can be examined. In addition, although not illustrated in the figure, either the structural member 2 or the multiple position distance measurement means 4 may be displaced in the optical axis direction of the transmitted X-ray image, and afterwards, the measurements taken by the multiple position distance measurement means 4 are corrected for the shift distance of the displaced one.

Figure 3:
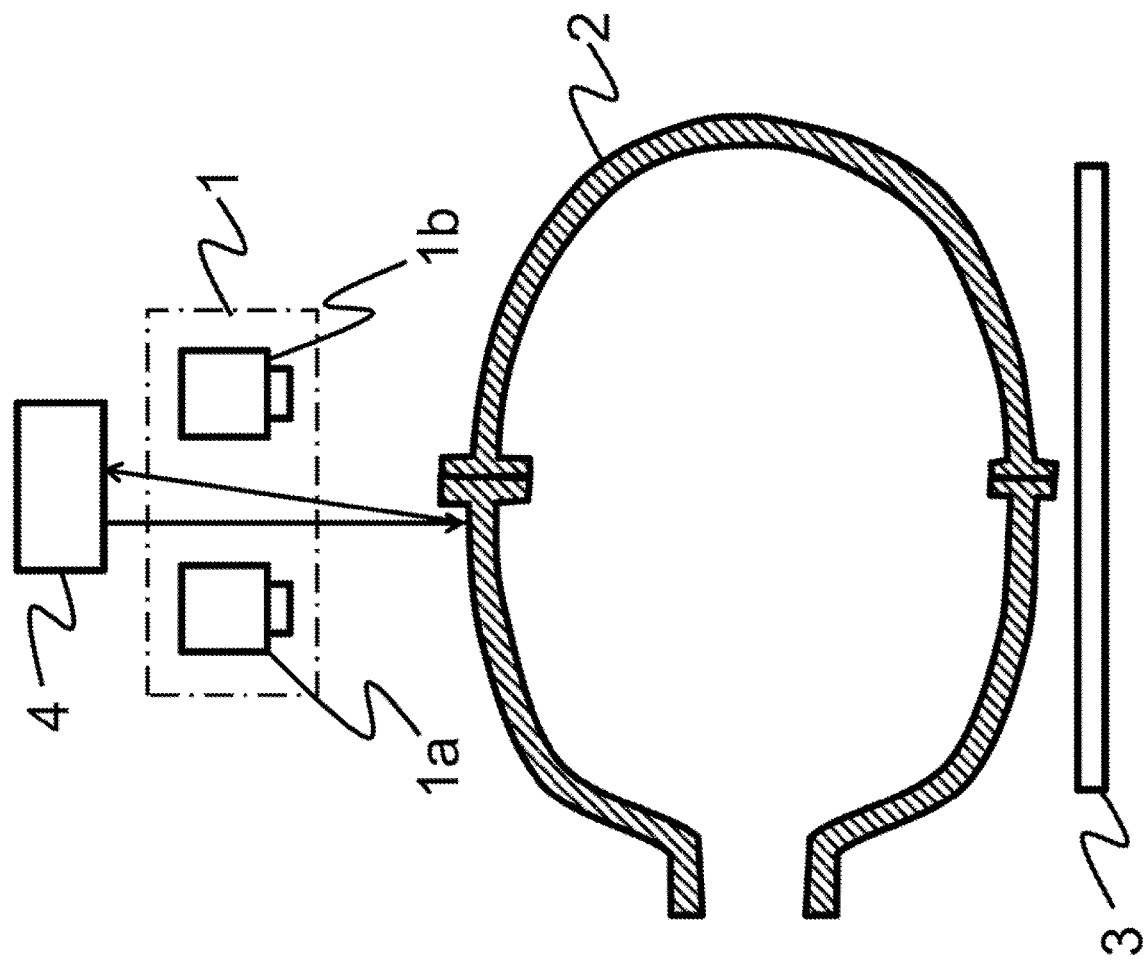
FIG. 3 is a schematic diagram for explaining the installation position of another multiple position distance measurement means according to an embodiment of the present invention.

Alternatively, in the case where a fin having an irregular rough surface shape is formed outside the joining face under inspection to prevent the multiple position distance measurement means 4 from performing accurate distance measurement, as illustrated in the schematic diagrams of the structural member 2 given in FIG. 1 and FIG. 3, an appropriate nearby position that is free of a fin may be adopted as a measuring point for distance measurement. In such a case, a more preferable method is to take measurements at a plurality of points, for example, on the right and left sides of the fin-containing joining face under inspection, followed by estimating the distance to the surface position right above the joining face by means of averaging, interpolation, etc. As another method, the fin-containing outside portion of the joining face may be ground to remove the fin and form a flat surface so that distance measurement can be performed at a position right above the joining face under inspection.

(Image Processing Means)

Figure 4:
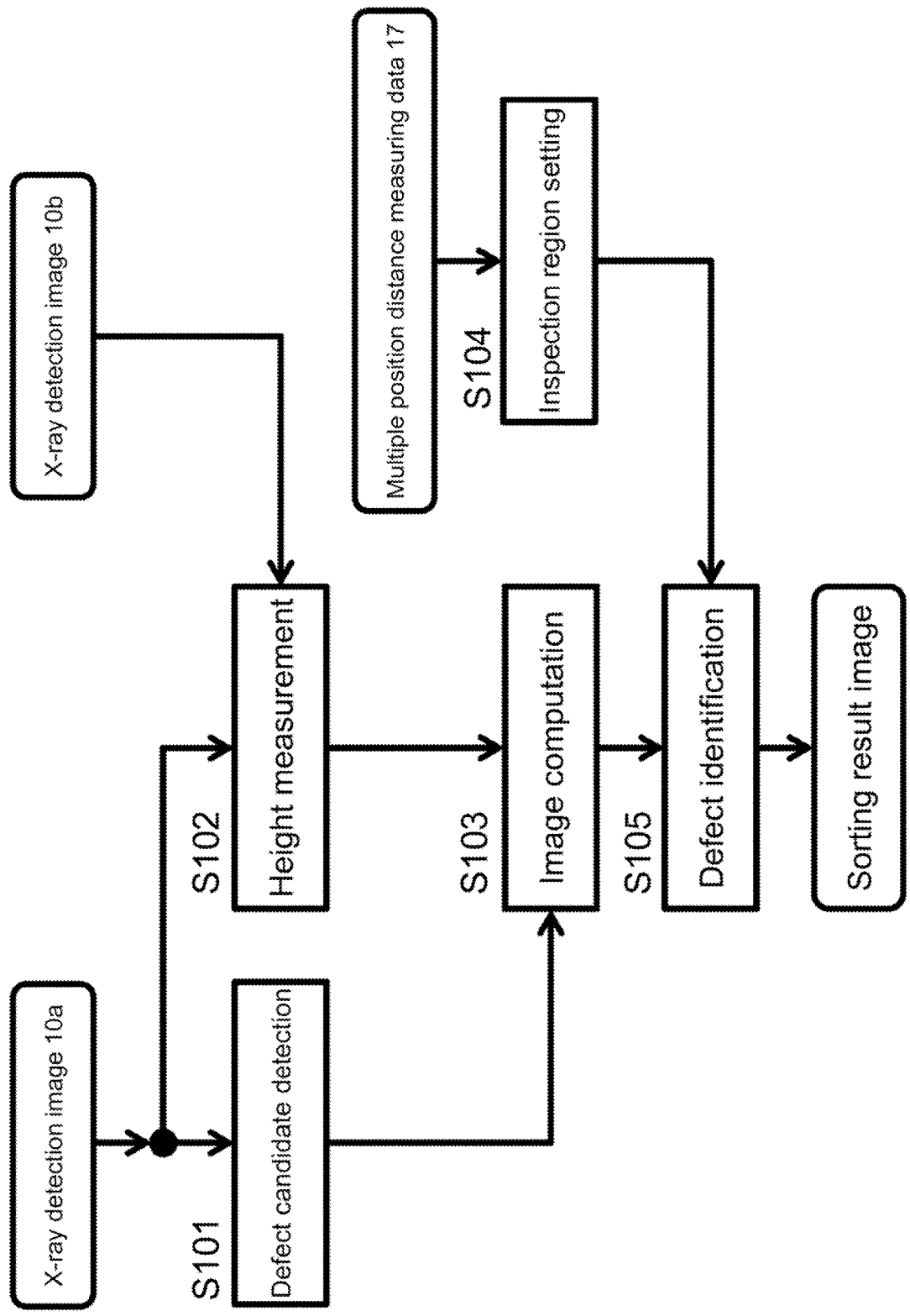
FIG. 4 is a flow chart for explaining the processing procedure performed by the image processing means.

As shown in FIG. 1, the image processing means 5 is connected to the X-ray detection means 3 and includes a defect candidate detection means for calculating the position of a defect candidate from X-ray detection images taken by the X-ray detection means 3, a height measurement means for calculating the height position of the defect candidate from the plurality of images, an image computation means for performing logical multiplication of the image having recorded height position information acquired by the height measurement means and a defect candidate image acquired by the defect candidate detection means, an inspection region setting means for setting an inspection region based on a plurality of position distance measurement data 20 taken by the multiple position distance measurement means 4, and a defect identification means for evaluating the defect candidate based on the height measurement results and inspection region setting results. The flow of processing by the image processing means 5 is described below with reference to FIG. 4. FIG. 4 is a flow chart for explaining the processing procedure performed by the image processing means. The X-ray detection image 10*a* is a detection image produced from the X-ray beams emitted from the X-ray emission means 1*a* and detected by the X-ray detection means 3, and the X-ray detection image 10*b* is a detection image produced from the X-ray beams emitted from the X-ray emission means 1*b* and detected by the X-ray detection means 3. A detection image shows luminance that represents the intensity of detected X-ray beams. The luminance value is large (bright) in a portion where X-ray beam is strongly detected whereas the luminance value is small (dark) in a portion where X-ray beam is weakly detected.

(Defect Candidate Detection Means)

Figure 7:
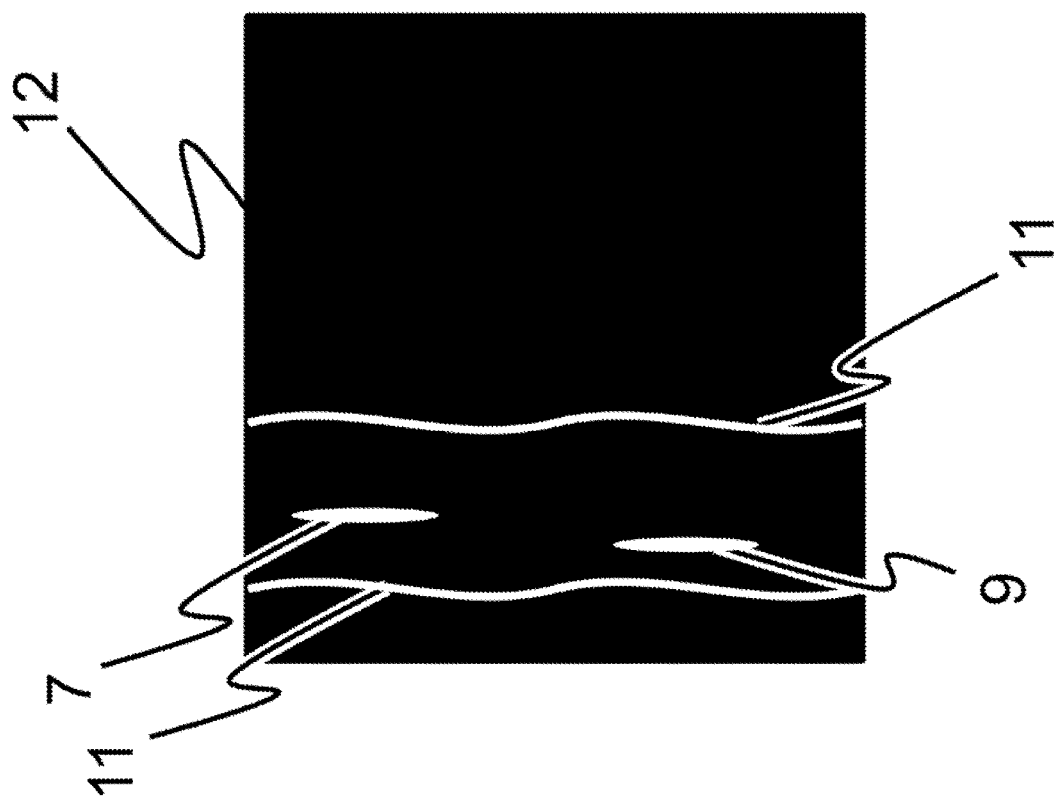
FIG. 7 is a typical processed image acquired by the defect candidate detection means.

In the step S101, the defect candidate detection means detects a defect candidate region based on an X-ray detect image. The defect candidate detection means detects, as a defect candidate, an area region that is defined by the luminance threshold in the bright direction and the luminance threshold in the dark direction to serve for separating defect candidate and non-defect regions in an X-ray detection image which is entered as two-dimensional image data. The detection procedure is performed on at least one X-ray detection image of the plurality of X-ray detection images, and in the Examples of the present invention, it is performed on the X-ray detection image 10*a* that is obtained from X-ray beams emitted from the X-ray emission means 1*a*. In the detection of defect candidates, those regions satisfying the thresholds may be narrowed down based on the size of the detected area or may be narrowed down based on feature quantities of the detected shape. For example, since voids and impurity components that act as defects generally have elongated shapes aligned in nearly the same direction along the joining face, the direction (angle) of the detected shape and the thinness (aspect ratio) thereof may be used as feature quantities for narrowing down them. In addition, since the thickness increases above and below a defect portion due to the influence of fins formed at the time of joining and accordingly the periphery of a defect is detected as a dark portion, a spatial filter or the like may be applied prior to the detection based on luminance thresholds. For example, to suppress the influence of a dark portion attributed to a fin, a high-pass filter for cutting low frequency components in the X-ray detection image works effectively, but in the present case, as seen in the defect candidate image shown in FIG. 7, an erroneous detection region 11 is identified as a defect candidate even along the boundary line between the fin portion and the normal high pressure tank member portion where the luminance in the X-ray detection image abruptly changes.

(Height Measurement Means)

Figure 5:
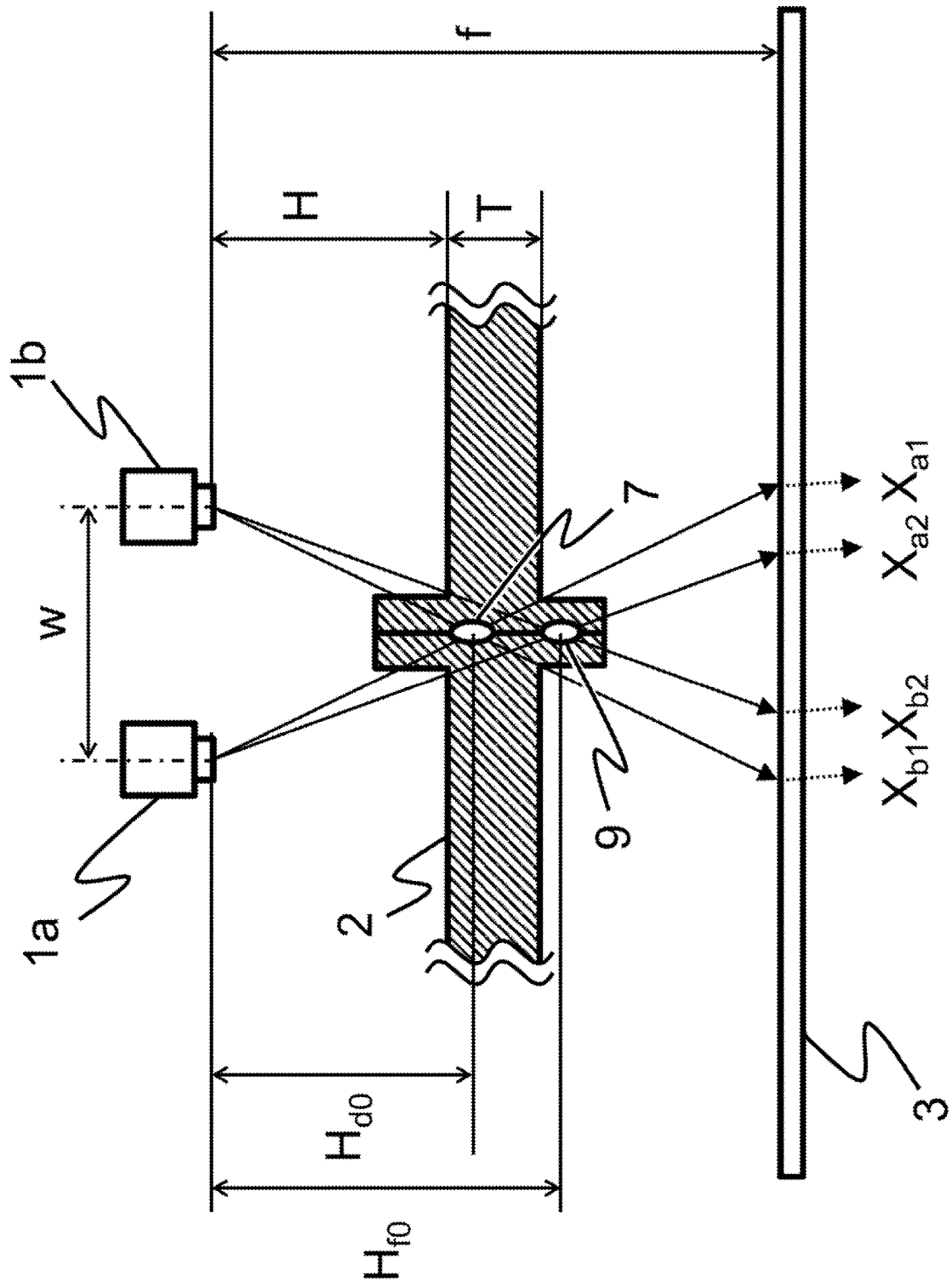
FIG. 5 is a schematic diagram for explaining the difference between the position of a defect portion and that of a non-defect portion detected by the X-ray detection means in the case where X-ray beams are emitted through two or more paths.
Figure 6:
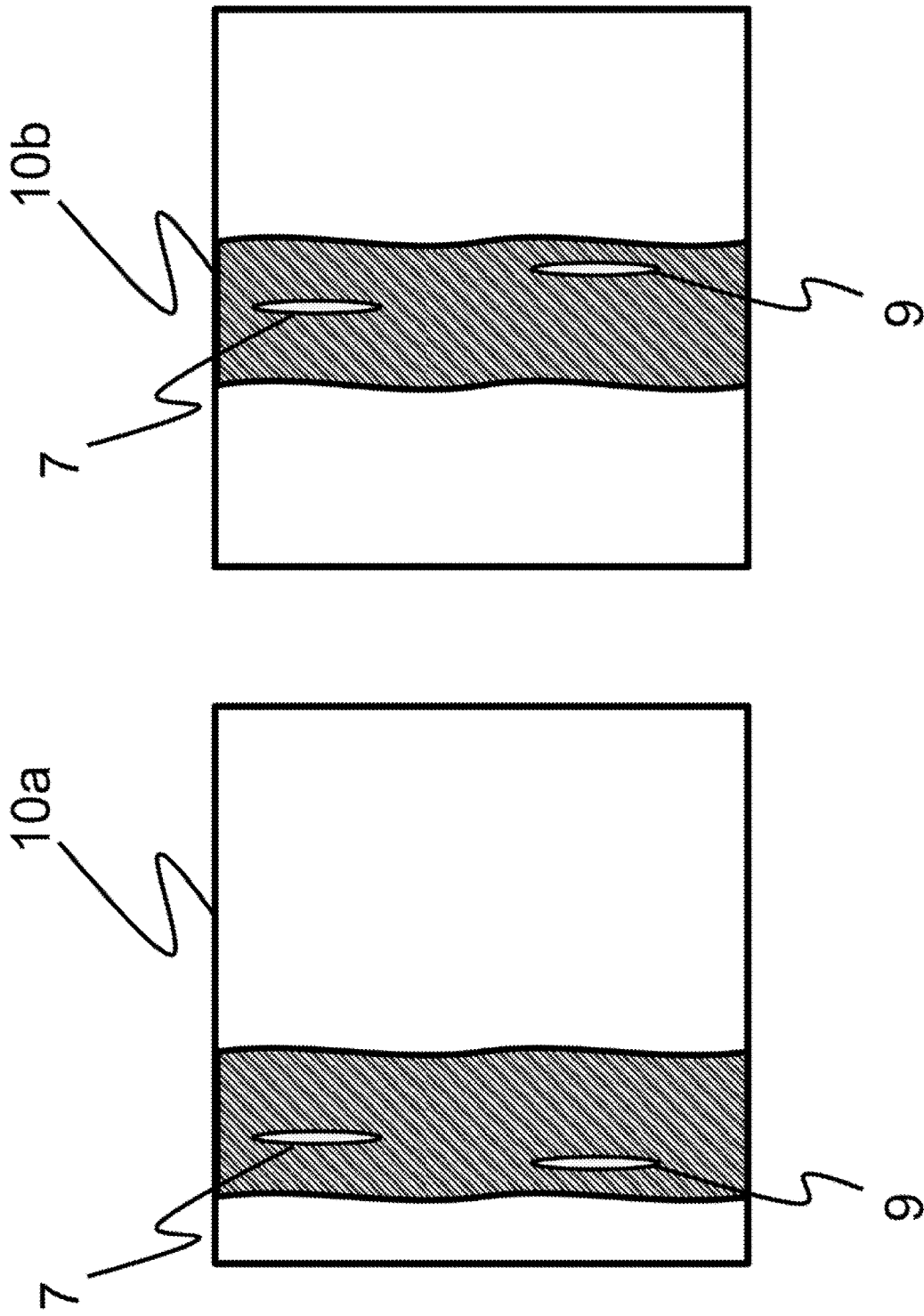
FIG. 6 is a typical image acquired by the X-ray detection means.

In the step S102, the height measurement means measures the height of the same point detected in a plurality of X-ray detected images. In order to deepen the understanding of the principle of this height measurement, it will be described in detail with reference to FIG. 5 and FIG. 6. FIG. 5 is a schematic diagram for explaining the difference between the position of a defect portion and that of a non-defect portion detected by the X-ray detection means in the case where X-ray beams are emitted through a plurality of paths. On the other hand, FIG. 6 is a typical image acquired by the X-ray detection means. To simplify the description, FIG. 5 shows only the cross section of the joint portion of the structural member 2 located nearer to the X-ray emission means 1. In the case where there exist a joint portion void defect 7 in the joint portion and a fin void 9 in the fin portion of the structural member 2, the X-ray beams emitted from the X-ray emission means 1*a* work to image the joint portion void defect 7 at the coordinate position of Xa1 and image the fin void 9 at the coordinate position of Xa2 on the X-ray detector 3, resulting in an image such as the X-ray detecting image 10*a* shown in FIG. 6. The X-ray beams emitted from the X-ray emission means 1*b* work to image the joint portion void defect 7 at the coordinate position of Xb1 and image the fin void 9 at the coordinate position of Xb2 on the X-ray detector 3, resulting in an image such as the X-ray detecting image 10*b* shown in FIG. 6. Here, the height position Hd0 of the joint portion void defect 7 is calculated by the equation 1 wherein f is the distance from the X-ray emission means 1*a* or the X-ray emission means 1*b* to the X-ray detector 3 and w is the distance between the X-ray emission means 1*a* and the X-ray emission means 1*b*.

$$Hd0 = f \times w / (|Xa1 - X1|) \quad \text{(Equation 1)}$$

The height position Hf0 of the fin void 9 is calculated by the equation 2.

$$Hf0 = f \times w / (|Xa2 - Xb2|) \quad \text{(Equation 2)}$$

Figure 8:
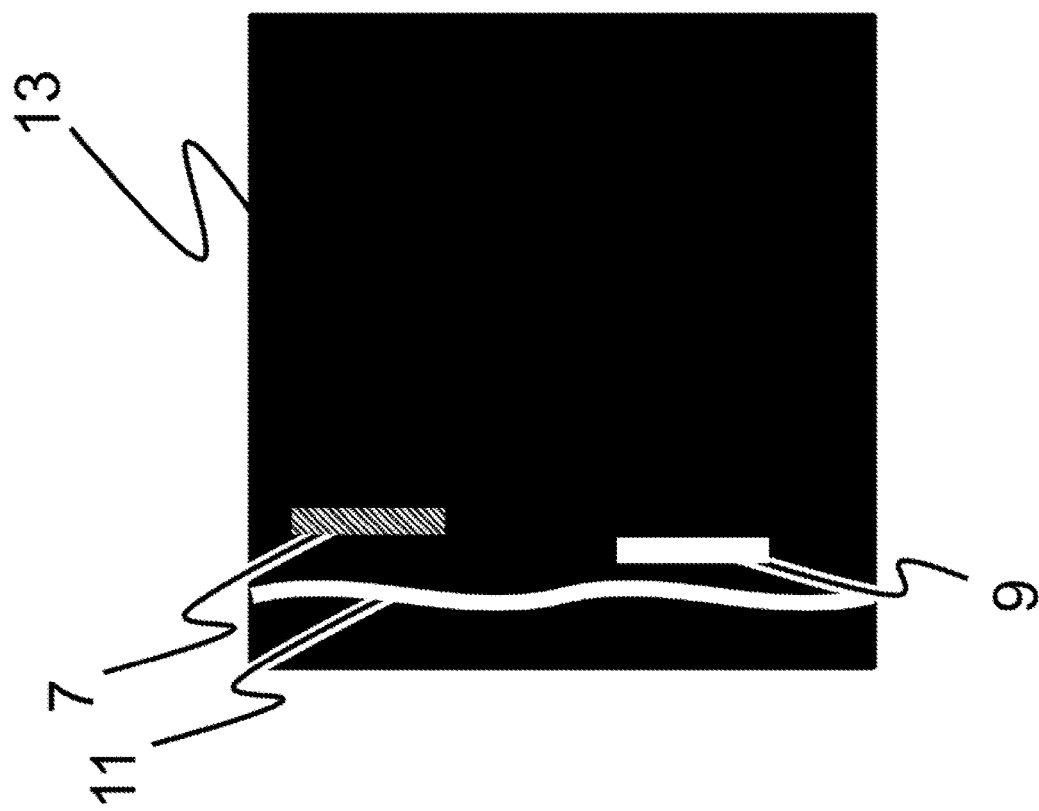
FIG. 8 is a typical result of stereo matching processing.

In order to sequentially execute the height measurement steps, a preferred embodiment of the present invention uses a technique called stereo matching for the execution of the height measurement steps, which enables relatively easy establishment of linkage between the points under height measurement corresponding to the X-ray detect image 10*a* and X-ray detect image 10*b*. Hereinafter, the height measurement steps will be described on the assumption that the stereo matching technique is used. The stereo matching technique, which is also called the block matching technique, is a widely adopted method that uses images taken from a plurality of different angles in order to calculate the height position of a point based on a shift (parallax) in image position that occurs between those images. In this method, an image block of a predetermined two-dimensional size centered on a pixel of interest is first set in either image and a position in the other image where the similarity between the former image and the latter image is highest is identified by an image similarity calculation method such as normalized correlation, followed by performing sequential calculations to obtain an stereo-matching processed image 13 including height information as given in FIG. 8 from the coordinate position information of the two images that link the positions.

When performing height measurement by the stereo matching technique, preprocessing may be performed on the X-ray detection image 10a and the X-ray detection image 10b so that a region regarded as a defect candidate can be detected more easily. For example, those regions satisfying the predetermined threshold in the light direction or the dark direction may be narrowed down based on the size of the detected area or may be narrowed down based on feature quantities of the detected shape. For example, since voids and impurity components that act as defects generally have elongated shapes aligned in nearly the same direction along the joining face, the direction (angle) of the detected shape and the thinness (aspect ratio) thereof may be used as feature quantities for narrowing down them. In addition, since the thickness increases above and below a defect portion due to the influence of fins formed at the time of joining and accordingly the periphery of a defect is detected as a dark portion, a spatial filter or the like may be applied prior to the detection based on luminance thresholds. For example, to suppress the influence of a dark portion attributed to a fin, a high-pass filter for cutting low frequency components in the X-ray detection image can work effectively.

(Image Computation Means)

Figure 9:
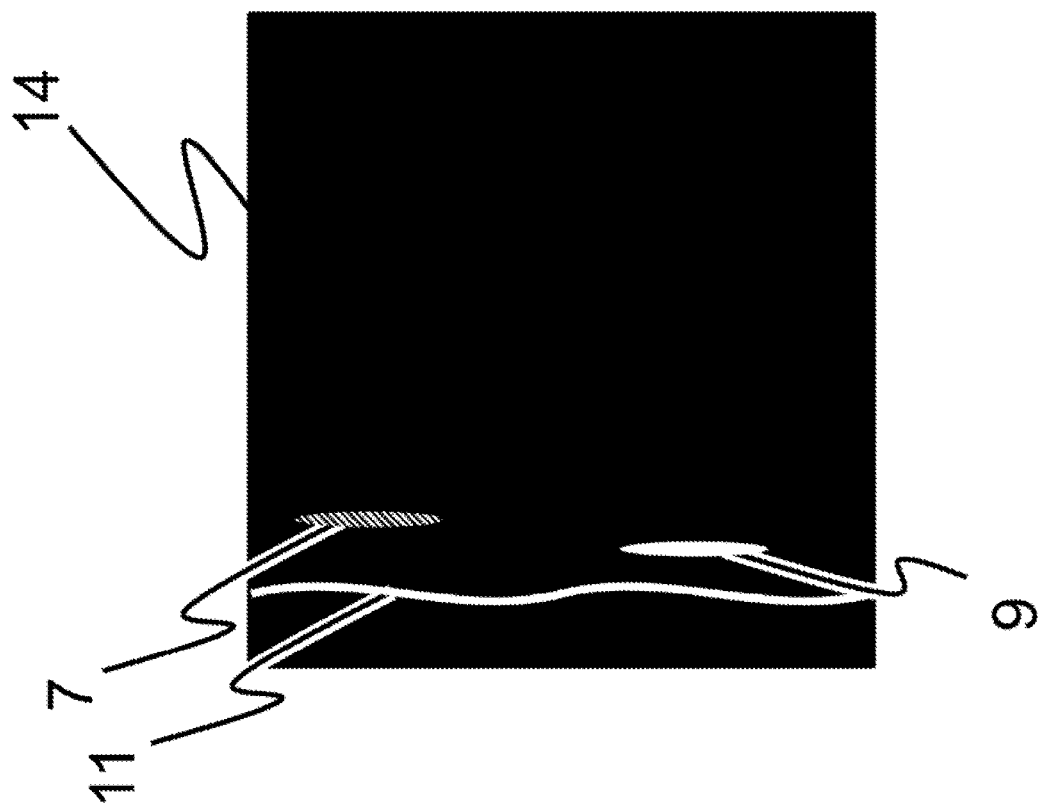
FIG. 9 is a typical image resulting from height position calculation.

The step S103 uses an image computation means to compute images. A height position calculation image 14 of a defect candidate as shown in FIG. 9 is obtained by performing logical multiplication of the defect candidate image 12 generated by defect candidate detection (S101) and the stereo matching image 13 generated by height measurement (S102).

(Inspection Region Setting Means)

The step S104 uses an inspection region setting means to set an inspection region. An inspection region is set based on the multiple position distance measurement data 20 that show distance measurements at a plurality of positions on the surface of the structural member 2 taken by the multiple position distance measurement means 4. To set an inspection region, a preferable method is to determine the surface profile of the structural member 2 from the distance measurements at the aforementioned plurality of positions and set the upper limit value and the lower limit value of the inspection region at each inspection position in the circumferential direction from the design thickness of the joint portion under inspection in the structural member 2. It is also preferable for the inspection region to be identical with the surface profile of the structural member estimated from the center position and the radius of the surface arc of the structural member 2 calculated from the distance measurements at the aforementioned plurality of positions.

The reason for this is described in detail below with reference FIGS. 10 to 15.

Figure 10:
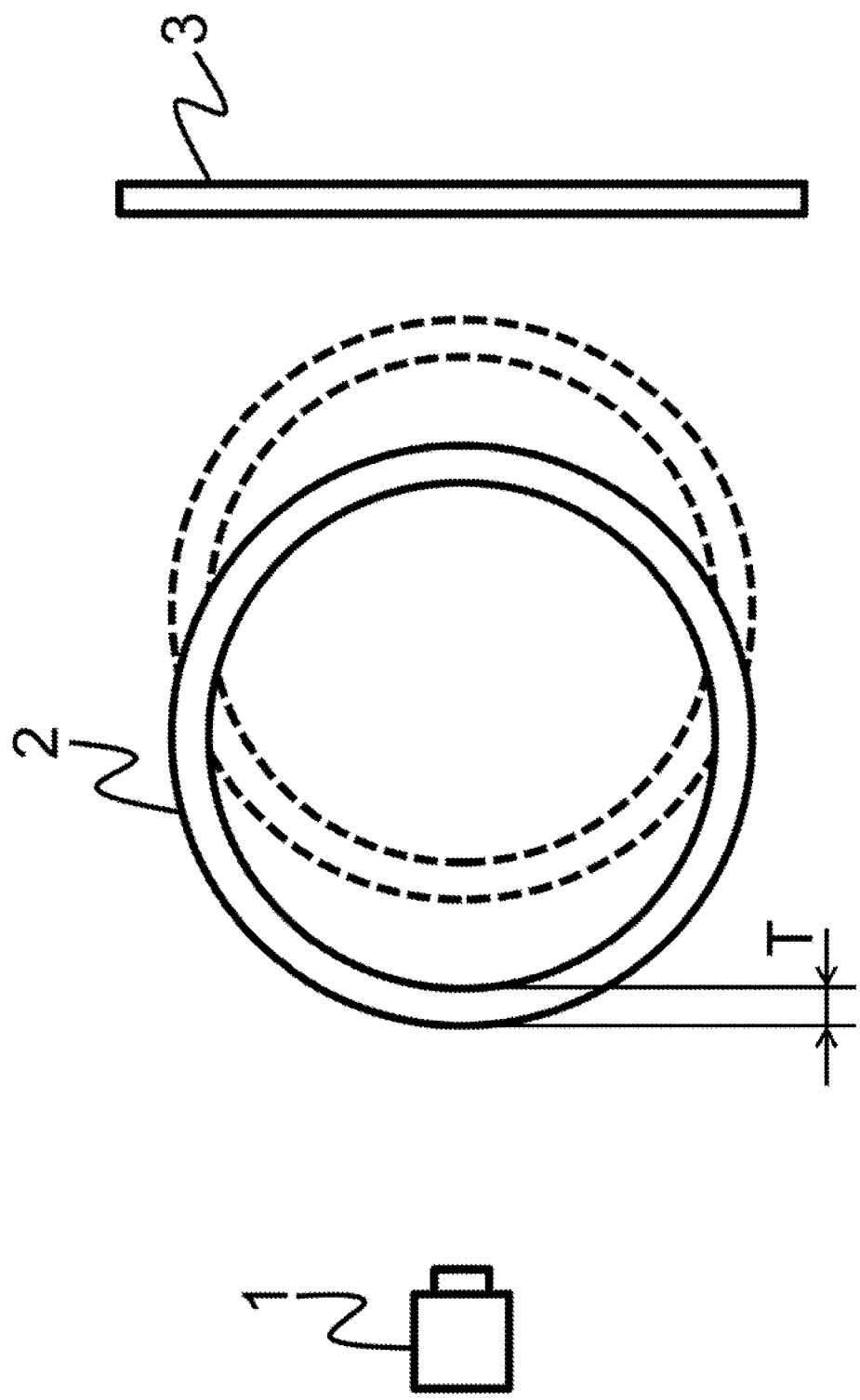
FIG. 10 is a schematic top view of a structural member located at a position shifted in the direction of the optical axis of the transmitted X-ray image.
Figure 11:
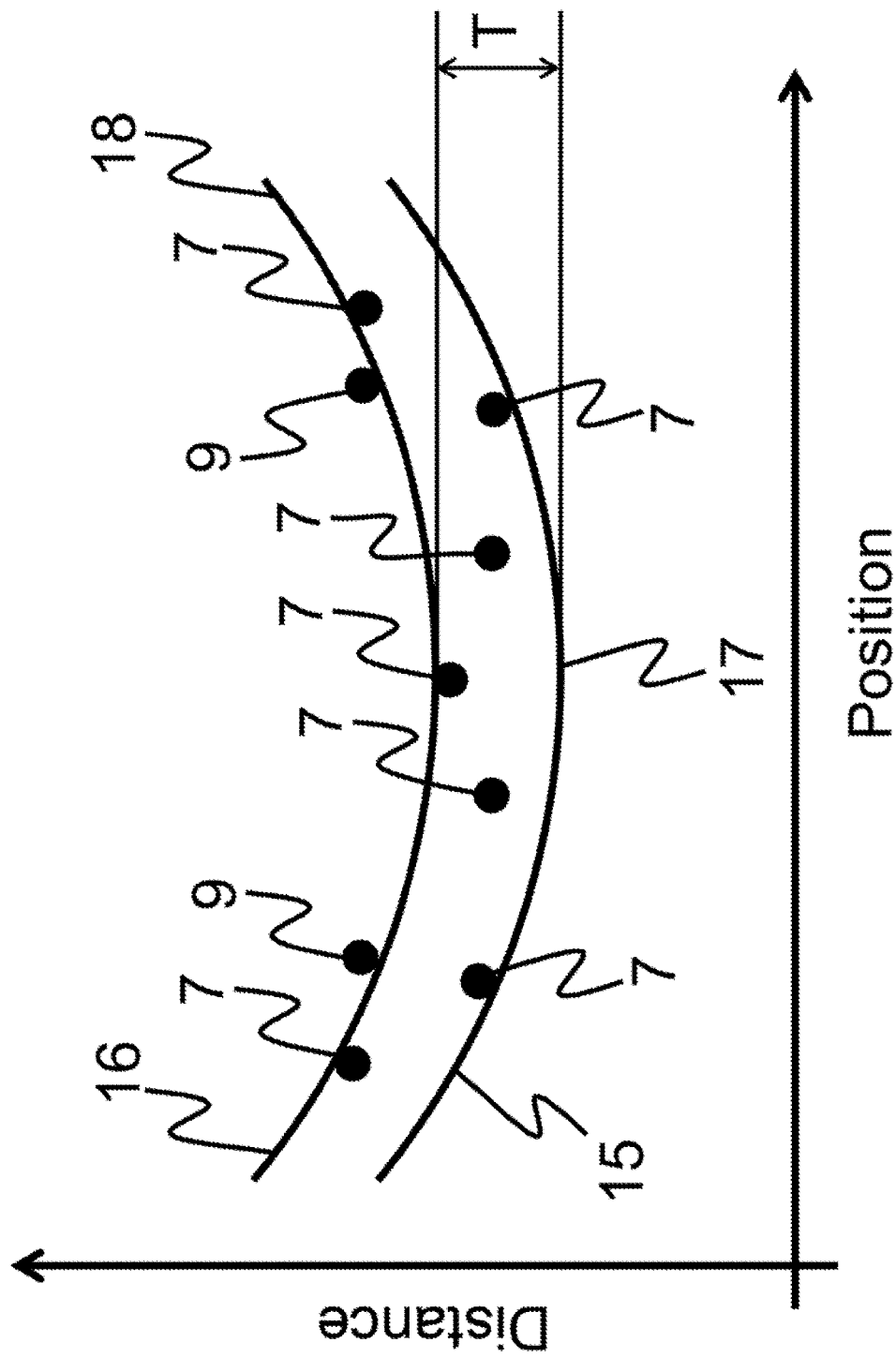
FIG. 11 is a defect map diagram of a typical inspection region in the case of a structural member located at a position shifted in the direction of the optical axis of the transmitted X-ray image.

FIG. 10 gives a schematic top view (viewed from the direction of the cylindrical axis of the substantially tubular structural member 2) of a structural member located at a position shifted in the direction of the optical axis of the transmitted X-ray image. If the structural member 2 has a diameter as designed, the position of the disposed structural member 2 is calculated based on the shift distance that is represented by the difference between the design value of the disposition position and the shortest value extracted from the multiple position distance measurement data taken by the multiple position distance measurement means 4. Specifically, the center position of the structural member 2 is moved by the aforementioned shift distance in the optical axis direction and the arc corresponding to the outside diameter of the joint portion under inspection in the structural member 2 is assumed to be represented by the set outside inspection region boundary threshold 15, whereas the arc corresponding to the inside diameter, which has a radius shorter by the thickness T of the joint portion under inspection in the structural member 2, is assumed to be represented by the set inside inspection region boundary threshold 16. Then, the actual outside inspection region boundary 17 and the set outside inspection region boundary threshold 15 will be identical to each other and the actual inside inspection region boundary 18 and the set inside inspection region boundary threshold 16 will be identical to each other. The inspection region is the region interposed between the set outside inspection region boundary threshold 15 and the set inside inspection region boundary threshold 16, and as seen from the defect map diagram in FIG. 11 showing a typical inspection region for the case where the structural member is shifted in the optical axis direction of the transmitted X-ray image, the void defect 7 in the joint portion is detected in the region defined by the set outside inspection region boundary threshold 15 and the set inside inspection region boundary threshold 16.

Figure 12:
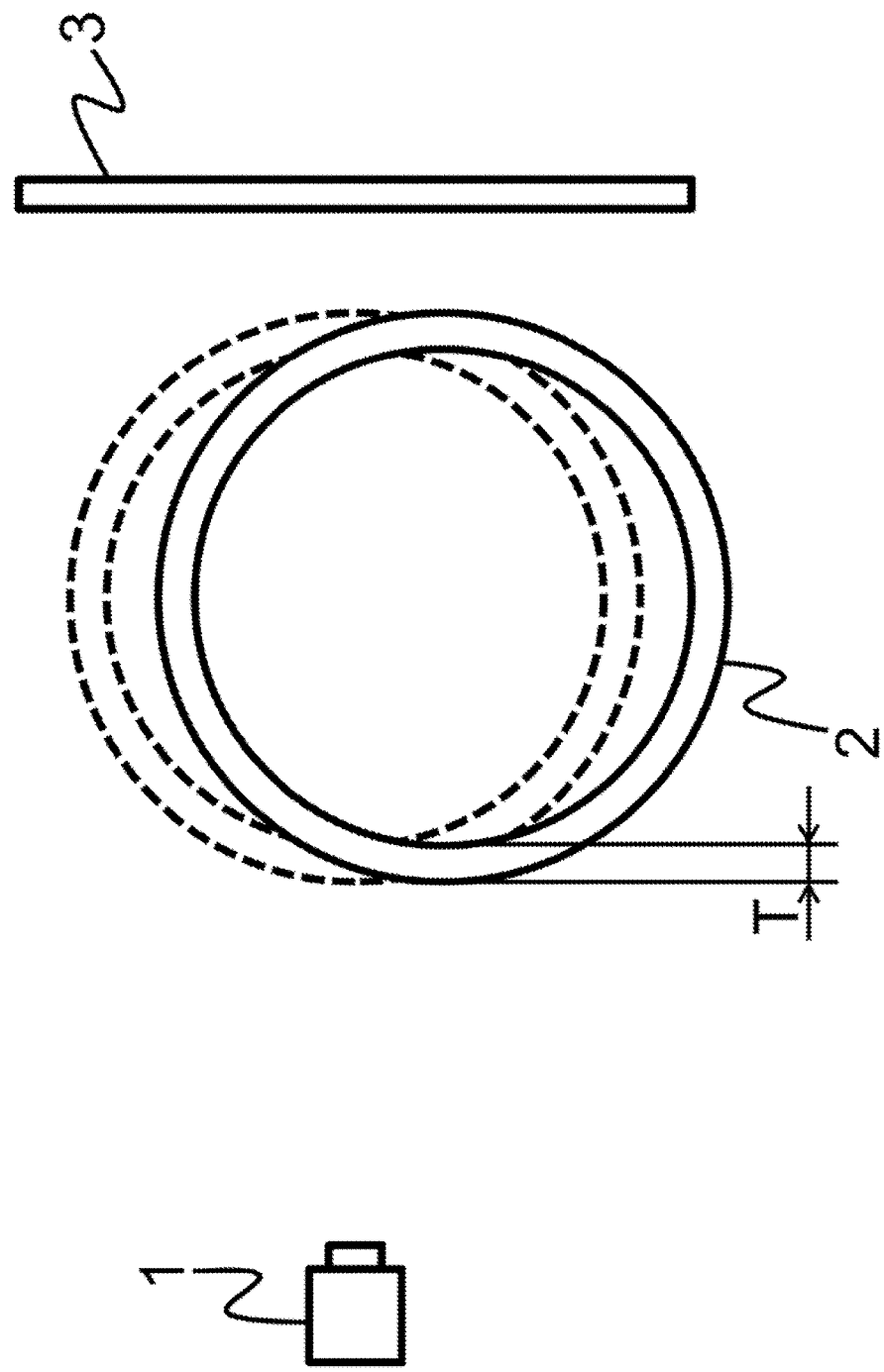
FIG. 12 is a schematic top view of a structural member located at a position shifted in a direction perpendicular to the optical axis of the transmitted X-ray image.
Figure 13:
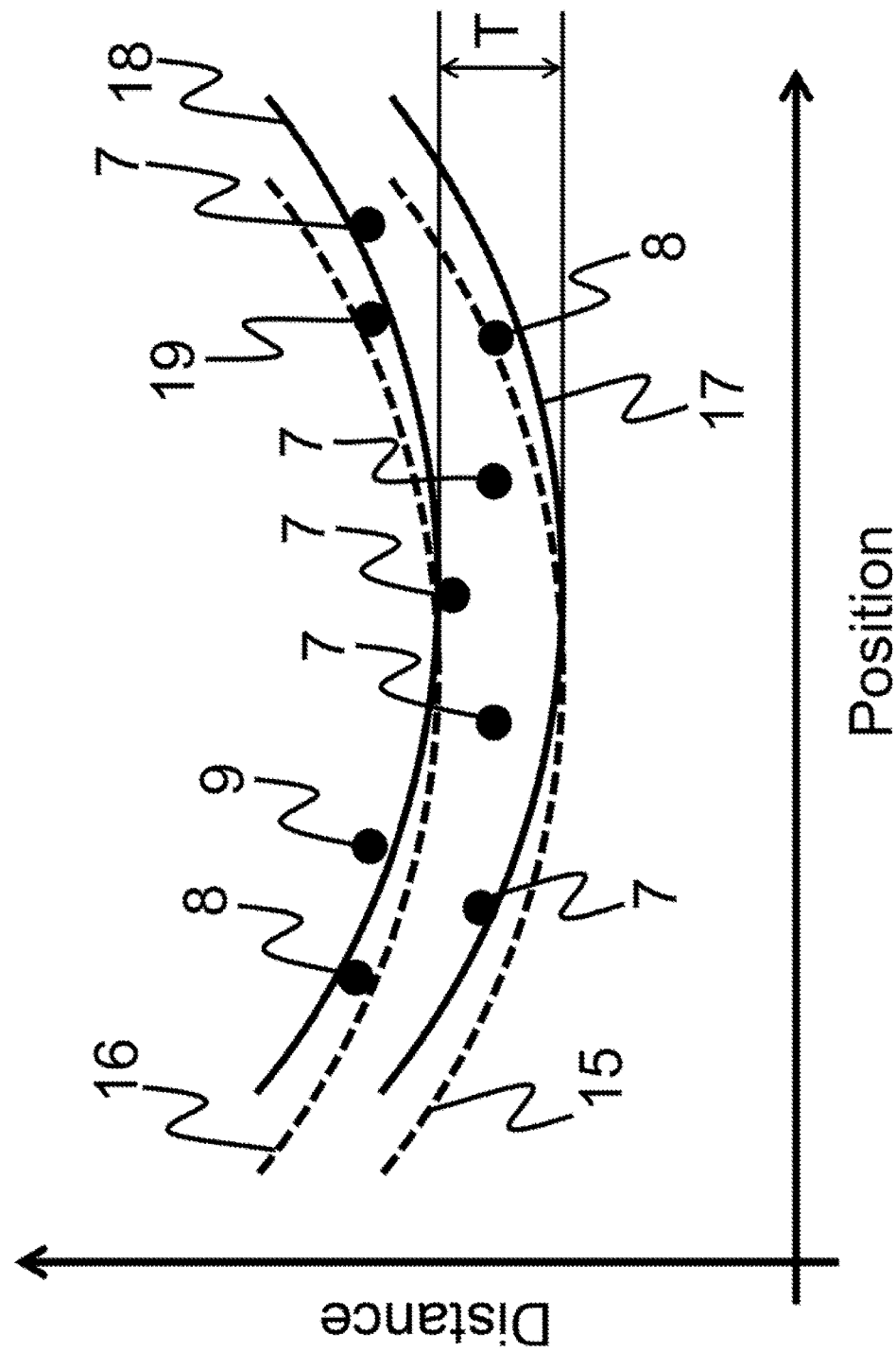
FIG. 13 is a defect map diagram of a typical inspection region in the case of a structural member located at a position shifted in a direction perpendicular to the optical axis of the transmitted X-ray image.

FIG. 12 gives a schematic top view (viewed from the direction of the cylindrical axis of the substantially tubular structural member 2) of a structural member located at a position shifted in the direction perpendicular to the optical axis of the transmitted X-ray image. If the structural member 2 has a diameter as designed, the position of the disposed structural member 2 is calculated based on the shift distance that is represented by the difference between the design value of the disposition position and the shortest value extracted from the multiple position distance measurement data taken by the multiple position distance measuring means 4. Specifically, the center position of the structural member 2 is moved by the aforementioned shift distance in the optical axis direction and the arc corresponding to the outside diameter of the joint portion under inspection in the structural member 2 is assumed to be represented by the set outside inspection region boundary threshold 15, whereas the arc corresponding to the inside diameter, which has a radius shorter by the thickness T of the joint portion under inspection in the structural member 2, is assumed to be represented by the set inside inspection region boundary threshold 16. Then, the actual outside inspection region boundary 17 and the set outside inspection region boundary threshold 15 will not be identical to each other and the actual inside inspection region boundary 18 and the set inside inspection region boundary threshold 16 will not be identical to each other. The inspection region is the region interposed between the set outside inspection region boundary threshold 15 and the set inside inspection region boundary threshold 16, and as seen from the defect map diagram in FIG. 13 showing a typical inspection region for the case where the structural member is shifted in the direction perpendicular to the optical axis direction of the transmitted X-ray image, a part of the void defect in the joint portion is detected outside the region defined by the set outside inspection region boundary threshold 15 and the set inside inspection region boundary threshold 16. It results in the overlooked void defect 8 in the joint portion, whereas some voids in the fin portion are detected in the region defined by the set outside inspection region boundary threshold 15 and the set inside inspection region boundary threshold 16, resulting in the misdetected voids 19 in the fin.

Figure 14:
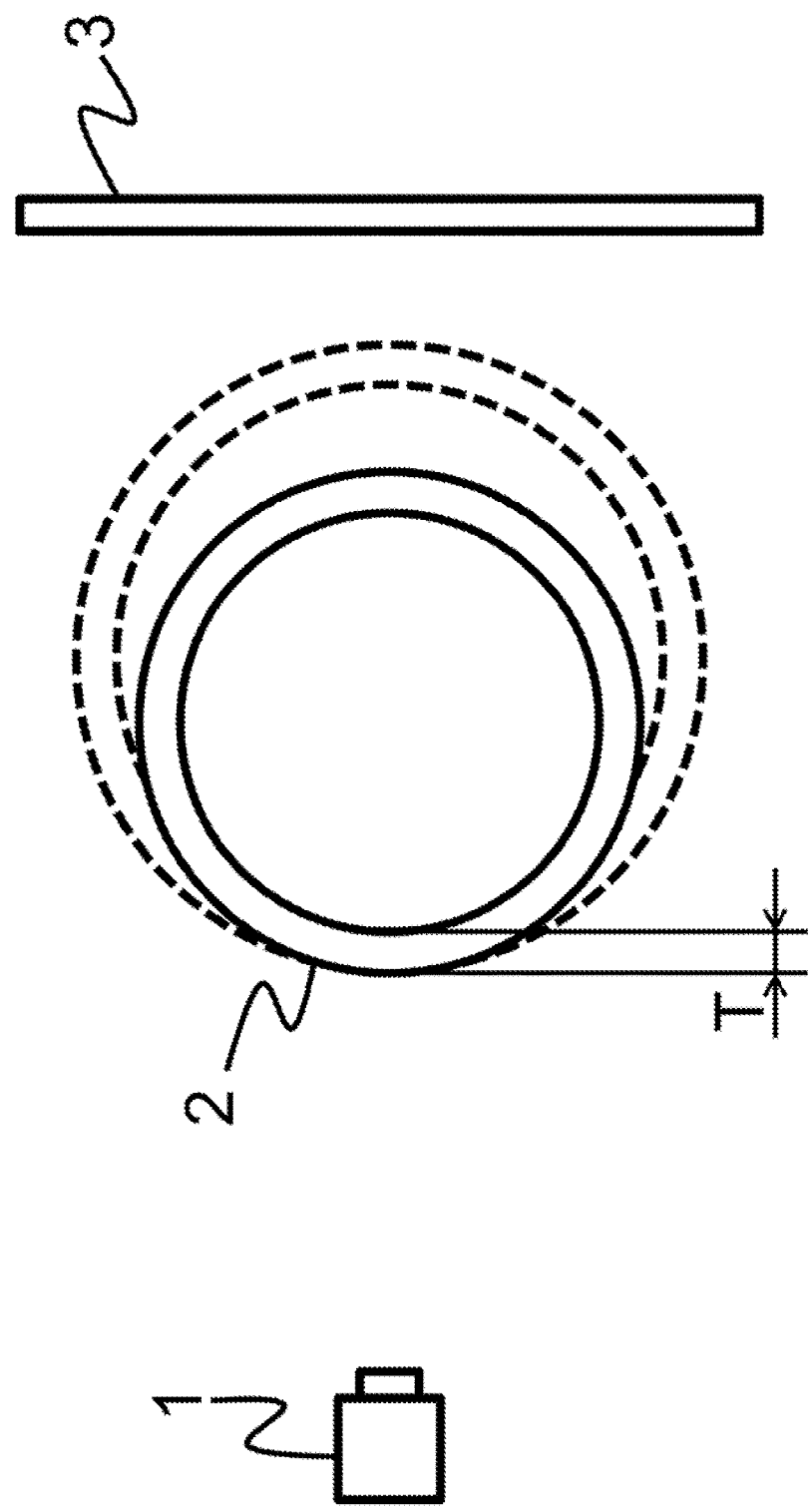
FIG. 14 is a schematic top view of structural members having different inside and outside diameters.
Figure 15:
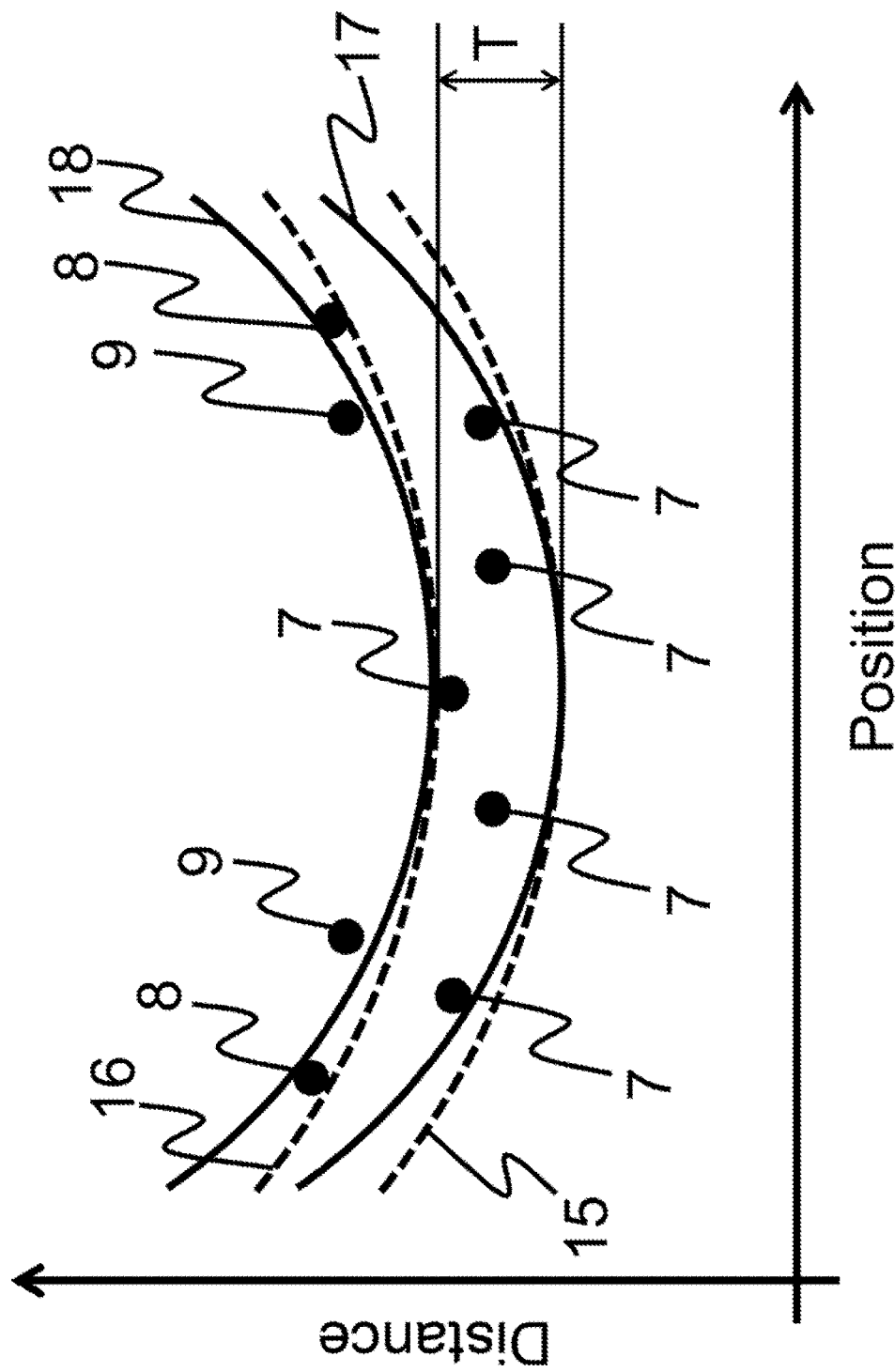
FIG. 15 is a defect map diagram of typical inspection regions of structural members having different inside and outside diameters.

FIG. 14 gives a schematic top view of a structural member having different inside and outside diameters. The position of the disposed structural member 2 is calculated based on the shift distance that is represented by the difference between the design value of the disposition position and the shortest value extracted from the multiple position distance measurement data taken by the multiple position distance measurement means 4. Specifically, the center position of the structural member 2 is moved by the aforementioned shift distance in the optical axis direction and the arc corresponding to the outside diameter of the joint portion under inspection in the structural member 2 is assumed to be represented by the set outside inspection region boundary threshold 15, whereas the arc corresponding to the inside diameter, which has a radius shorter by the thickness T of the joint portion under inspection in the structural member 2, is assumed to be represented by the set inside inspection region boundary threshold 16. Then, the actual outside inspection region boundary 17 and the set outside inspection region boundary threshold 15 will not be identical to each other and the actual inside inspection region boundary 18 and the set inside inspection region boundary threshold 16 will not be identical to each other. The inspection region is the region interposed between the set outside inspection region boundary threshold 15 and the set inside inspection region boundary threshold 16, and as seen from the defect map diagram in FIG. 15 showing a typical inspection region in a structural member having different inside and outside diameters is disposed, a part of the void defect in the joint portion is detected outside the region defined by the set outside inspection region boundary threshold 15 and the set inside inspection region boundary threshold 16, resulting in the overlooked void defect 8 in the joint portion.

Figure 16:
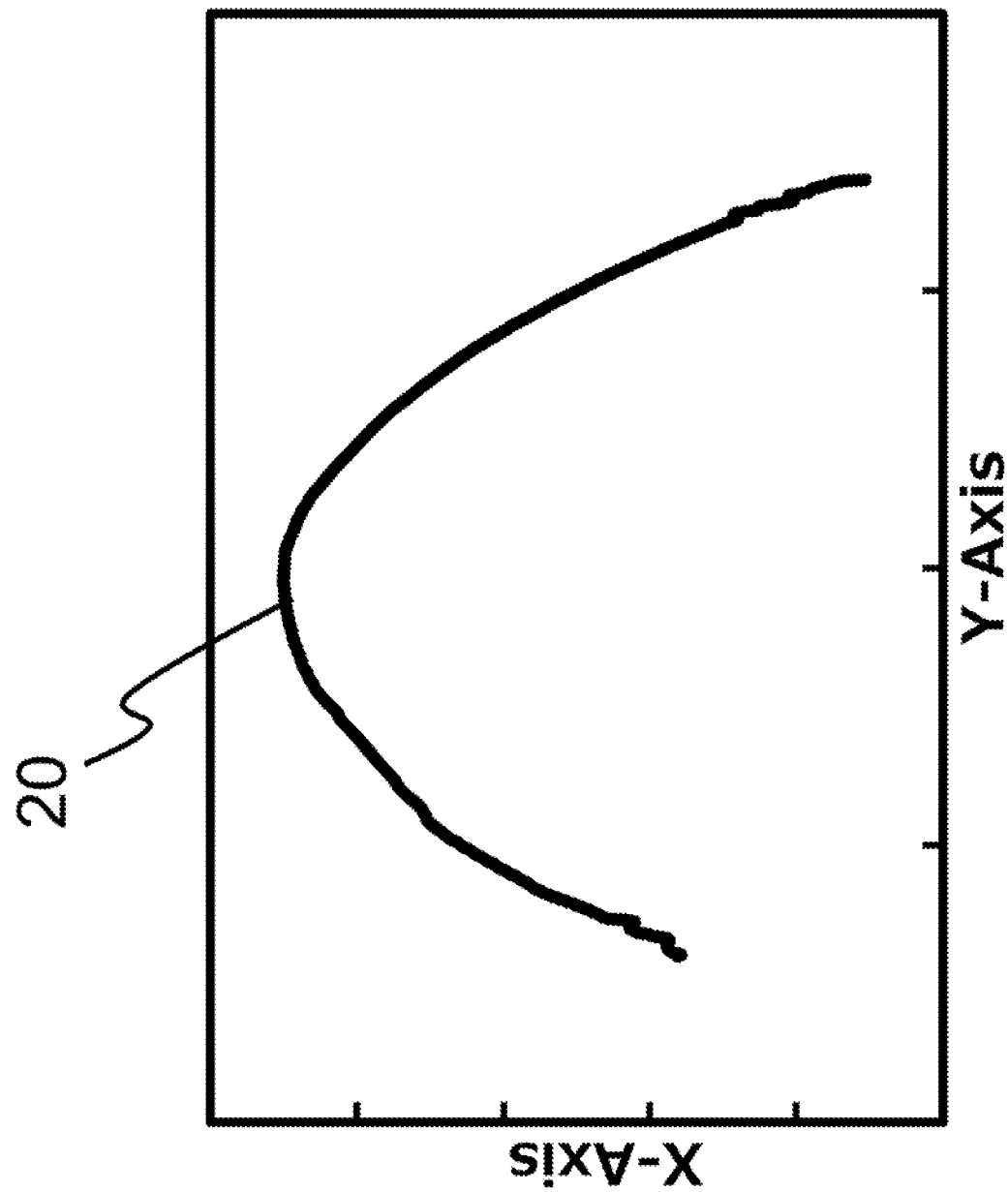
FIG. 16 shows typical multiple position distance measuring data obtained by the multiple position distance measurement means.
Figure 17:
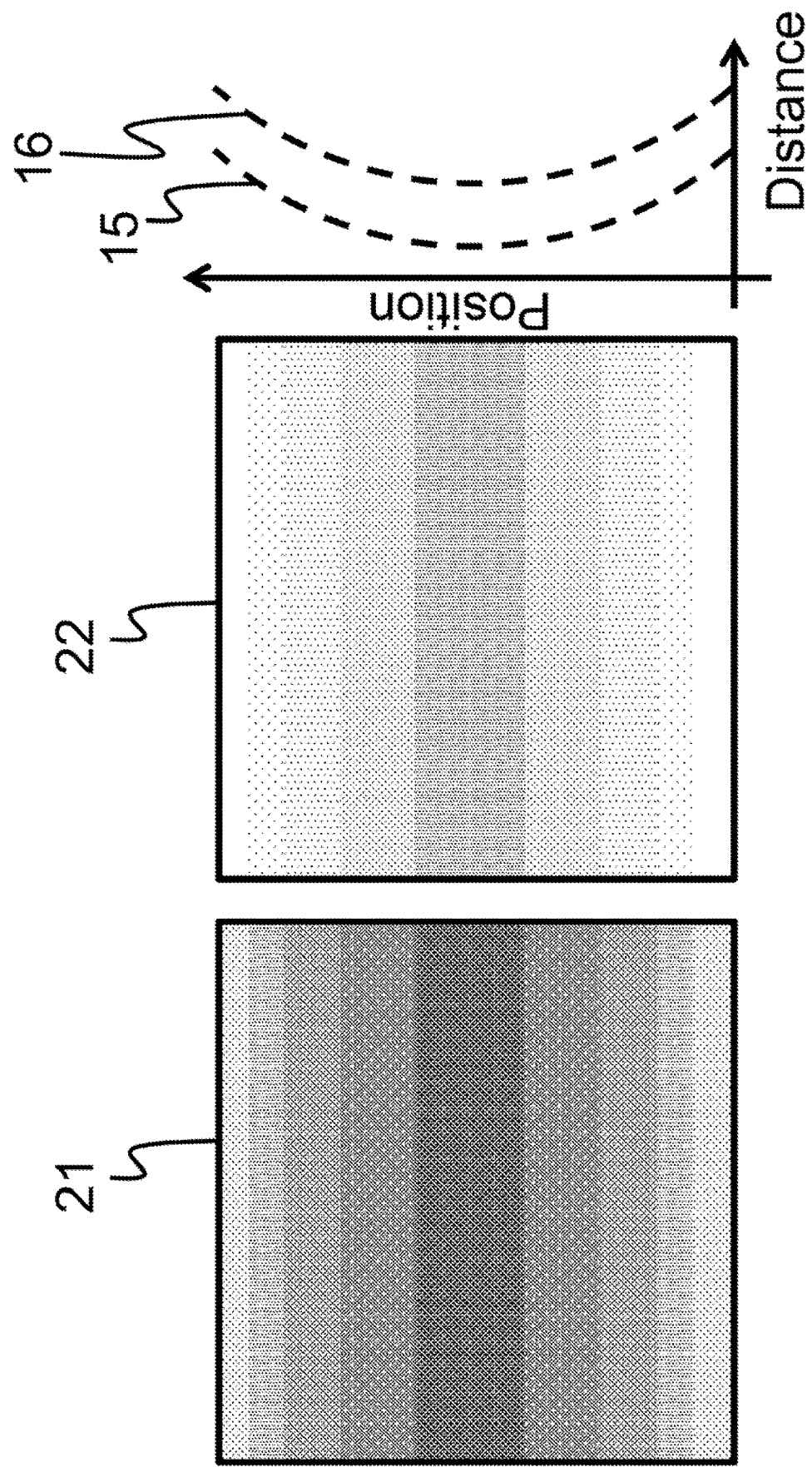
FIG. 17 shows typical outside and inside inspection region boundary images and their height profiles in the image alignment direction.
Figure 18:
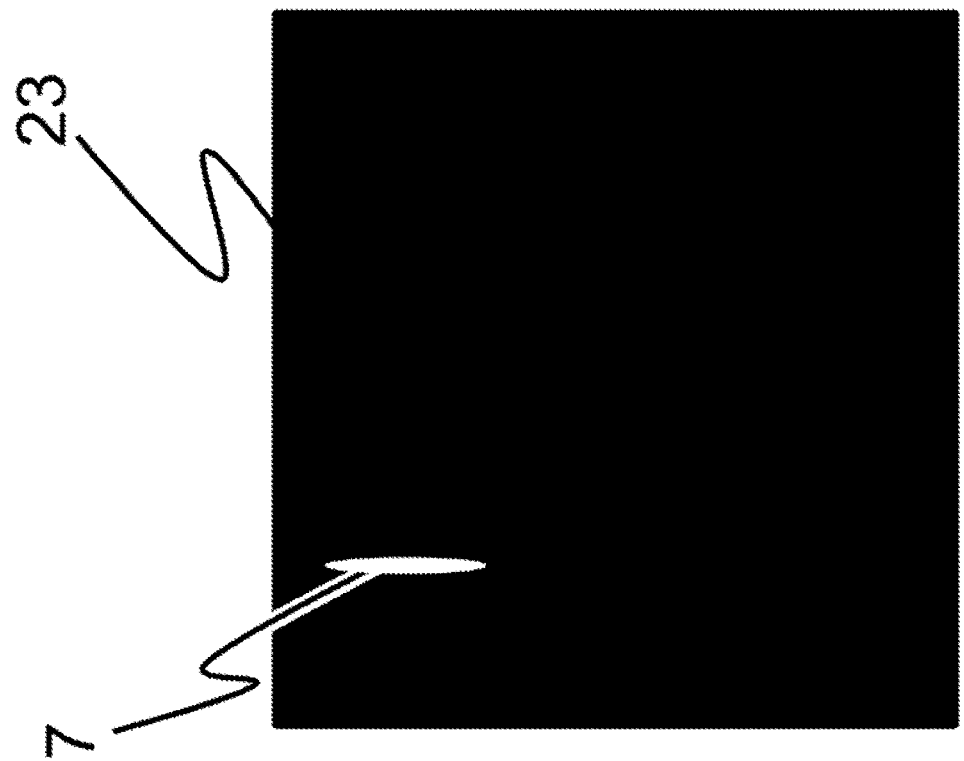
FIG. 18 is a typical sorting result obtained by the defect identification means.

For the shift distance in the position of the disposed structural member 2, therefore, accurate inspection region setting cannot be realized only by a correction in the optical axis direction of the transmitted X-ray image, and it is necessary to make not only a correction in the direction perpendicular to the optical axis of the transmitted X-ray image but also a correction of the shift distance in terms of the diameter of the structural member 2. Accordingly, it is preferred to use a circular function model method in which a model function for the surface profile of the structural member 2 is set up based on the multiple position distance measurement data 20 taken by the multiple position distance measurement means 4 to represent a plurality of distance values on the surface of the structural member 2, followed by estimating the position of the rotation center of the arc and the radius of the arc by a model fitting technique using, for example, the least square method. Furthermore, in the case where the structural member 2 is made of a resin material, an elliptic function model may be adopted because the shape of the cross section perpendicular to the cylindrical axis of the substantially tubular body of the structural member 2 may become elliptic as a result of structural deformation etc. that can occur during the production or disposition of the structural member 2. Here, the multiple position distance measurement data 20 taken by the multiple position distance measurement means 4 to represent a plurality of distance values on the surface of the structural member 2 may contain noise and vertical measurement fluctuations showing surface roughness that are attributed to the surface conditions of the joint portion under inspection or measuring accuracy of the multiple position distance measurement means 4, as illustrated in FIG. 16, and therefore, it may also be good for the aforementioned model fitting processing to be preceded by preprocessing for noise component removal such as limiting the calculation range of the model fitting processing, applying a spatial filter such as low-pass filter, and performing a model fitting approach using a median filter etc.

Here, if a circular function model as defined by the equation 3 given below is used for the model fitting approach, the three response variables of X0, Y0, and R are to be derived.

X: X-axis coordinate value of the measuring point of the multiple position distance measurement means 4

Y: Y-axis coordinate value of the measuring point of the multiple position distance measurement means 4

X0: X-axis coordinate value of the center of the tubular structural member 2

Y0: Y-axis coordinate value of the center of the tubular structural member 2

R: radius of the tubular structural member 2

Then, $$R^2 = (X-X0)^2 + (Y-Y0)^2 \qquad \text{(Equation 3)}$$

In the case where there are three unknown response variables to be determined by model fitting using the least square method, at least four or more measurements have to be taken by the multiple position distance measurement means 4 when measuring the distance of a plurality of points on the surface of the structural member 2. Actually, the expected precision of analysis by model fitting improves with an increasing number of measurements and there are no particular upper limit on the number of measurements. A practical limit may be set based on the required computation process time and the accuracy to be achieved, and the total number of measurements is preferably in the range of 4 to 500, or 100 to 10,000.

In addition, the inspection region setting means assumes inside inspection region boundary threshold and outside inspection region boundary threshold from the design wall thickness of the joint portion under inspection and use them for the setting. Specifically, outside inspection region boundary threshold is set on the basis of the allowable depth from the surface of the structural member 2 that is tolerable even if a defect occurs, whereas inside inspection region boundary threshold is set on the basis of the design wall thickness of the structural member 2 and the allowable depth that is tolerable even if a defect occurs. Here, in order to prevent a defect from being overlooked, inside inspection region boundary threshold and outside inspection region boundary threshold may be adjusted so that the inspection region is broadened as compared with the design wall thickness. As a generally preferred method, the threshold value may be narrowed for inside inspection region boundary threshold whereas the threshold value may be widened for outside inspection region boundary threshold.

The surface profile of the structural member 2 calculated by the procedure described above is then used to produce an outside inspection region boundary image 21 and an inside inspection region boundary image 22. The region interposed between the outside inspection region boundary image 21 and the inside inspection region boundary image 22 is adopted to serve as an inspection region. At each pixel position, it has a boundary threshold value of the inspection region at each image pixel position in the inspection space.

(Defect Identification Means)

The step S105 uses a defect identification means to identify defects. The defect identification means (execution of S105) compares the height position calculation image 20 of a defect candidate proposed by the image computation means (execution of S103) with the outside inspection region boundary image 21 developed from the surface profile of the joint portion under inspection in the structural member 2, as lower height limit, and with the inside inspection region boundary image 22, as upper height limit. For each pixel of the image, examination is made to determine whether each defect candidate is included in the region between the lower height limit value and the upper height limit value. It is judged to be a void defect if it is included whereas it is judged to be a void, impurity component, etc., existing in a fin, or misdetection if it is not included.

Since the height position of a defect candidate is not a specific value, but may have a certain height range depending on the shape, the defect identification means (execution of S105) judges a defect candidate to be a defect if a part of the defect candidate is included in the aforementioned region between the inspection region's upper limit and lower limit. However, when the area of the defect is small or when the gradient of the height of the defect is steep, the height information of the defect may not include values between the upper limit and lower limit in some cases. To allow such a defect candidate to be judged as a defect, it may be judged as a defect if the maximum height of the defect is lower than the upper limit and the minimum height is lower than the lower limit.

In this embodiment of the present invention, the misdetected area 11 and the void 9 in the fin are located above the predetermined upper height limit value and therefore are not judged to be defects, and only the void defect 7 in the joint portion is located in the region between the upper height limit and lower height limit and sorted out as a defect, resulting in a defect sorting result image 23.

Thus, an embodiment of the present invention has been described above with reference to drawings, taking as an example a setup in which two or more X-ray emission means 1 are used to provide two or more X-ray emission paths. For the present invention, modified embodiments such as described below can be adopted.

Figure 19:
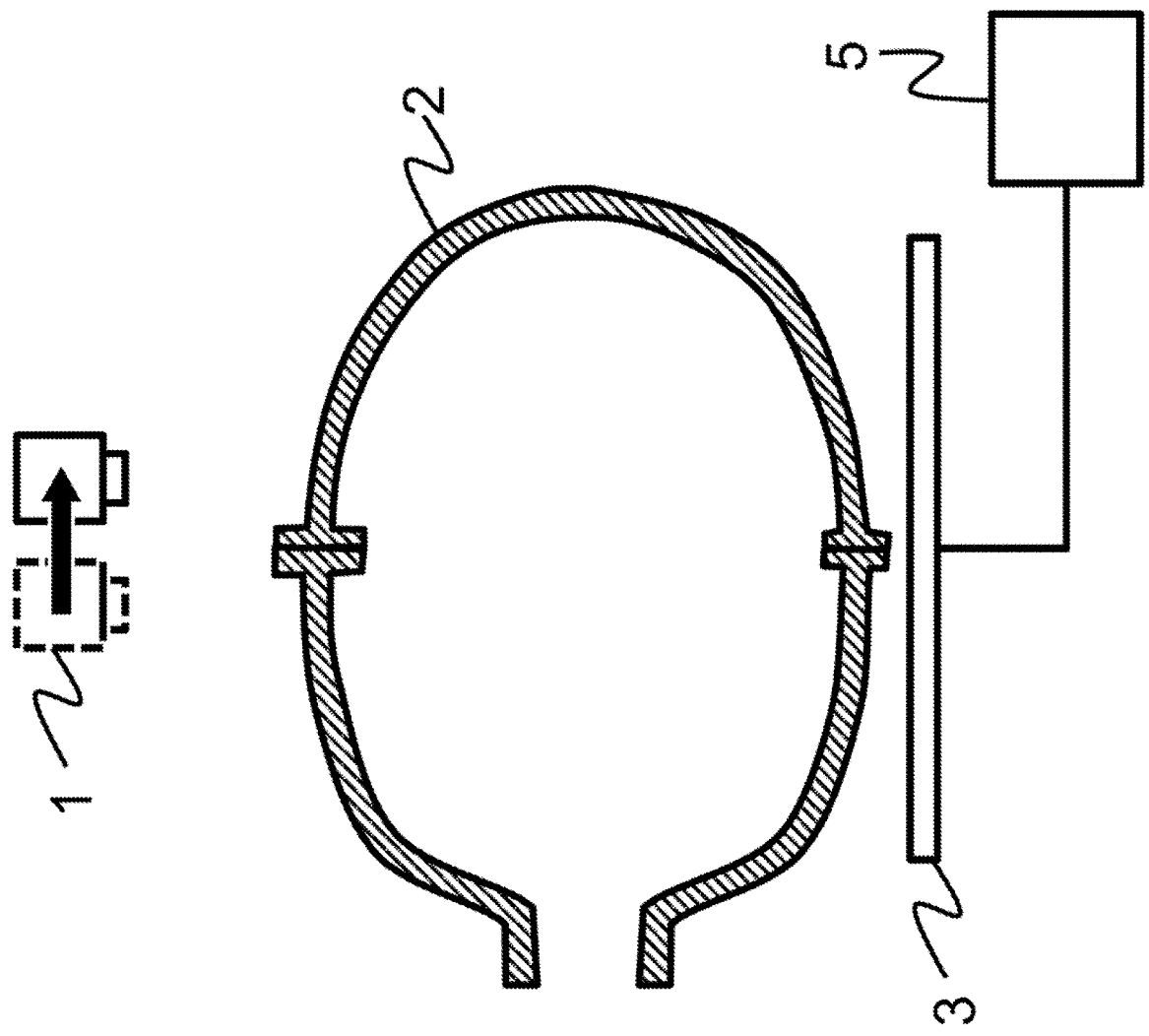
FIG. 19 is a schematic diagram for explaining a setup according to an embodiment of the present invention that is provided with a means for moving the X-ray emission means.

(1) A setup in which the X-ray emission means 1 is moved each time an X-ray beam is detected by the X-ray detection means 3 in order to provide two or more X-ray emitting paths. A schematic diagram is shown in FIG. 19. FIG. 19 is a schematic diagram for explaining a setup according to an embodiment of the present invention that is provided with a means of moving the X-ray emission means. To simplify the description, the multiple position distance measurement means 4 is not shown. The means of moving the X-ray emission means is preferably configured so that its moving direction is parallel to the X-ray detection means 3 and perpendicular to the joining face.

Figure 20:
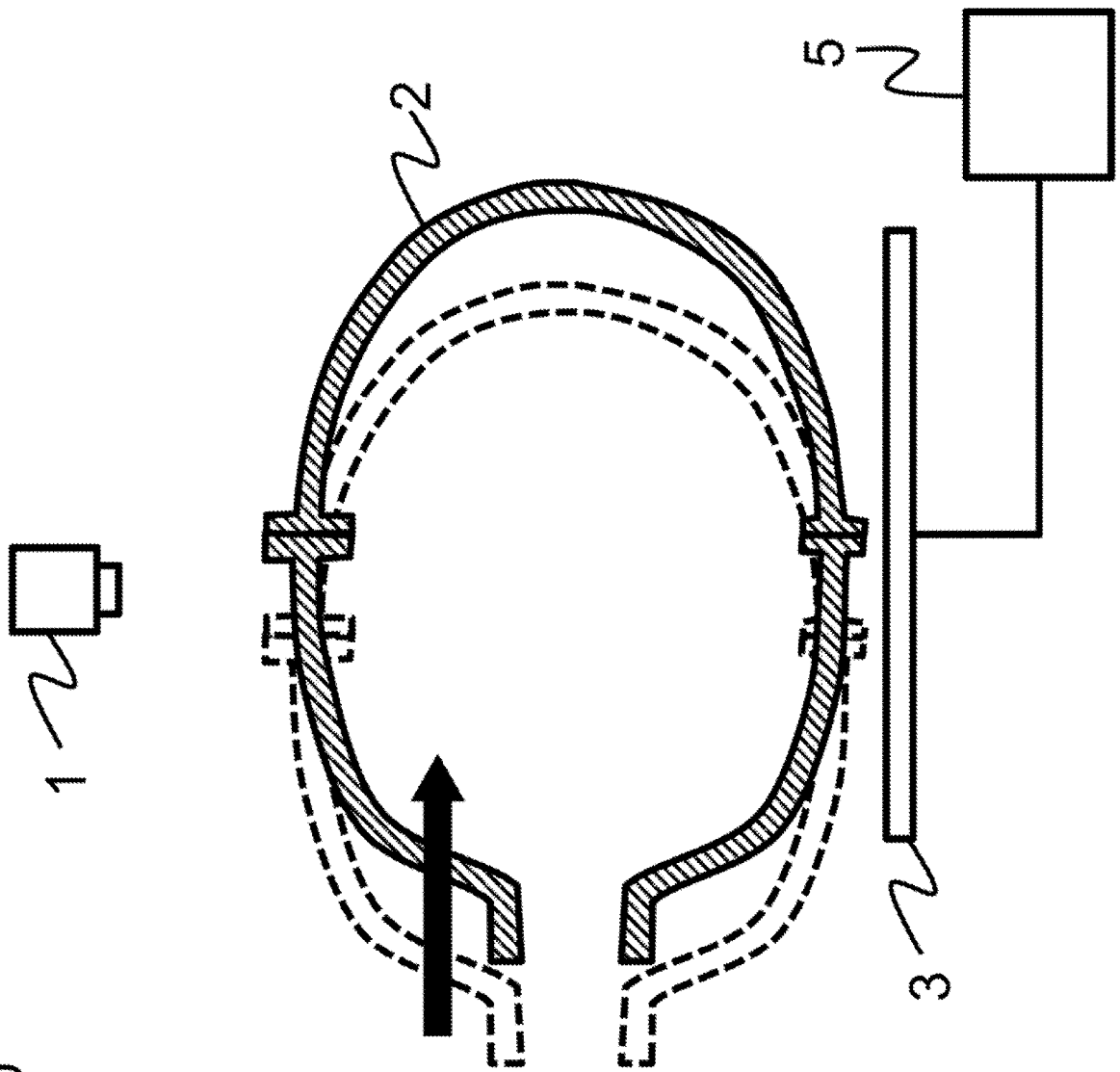
FIG. 20 is a schematic diagram for explaining a setup according to an embodiment of the present invention that is provided with a means for moving the high pressure tank member.

(2) A setup in which the structural member 2 is moved each time an X-ray beam is detected by the X-ray detection means 3 in order to provide two or more X-ray emitting paths. A schematic diagram is shown in FIG. 20. FIG. 20 is a schematic diagram for explaining a setup according to an embodiment of the present invention that is provided with a means of moving the structural member 2. To simplify the description, the multiple position distance measurement means 4 is not shown. The means of moving the structural member 2 is preferably configured so that its moving direction is parallel to the X-ray detection means 3 and perpendicular to the joining face.

Furthermore, any of the embodiments of the present invention may be combined with a further modified embodiment such as described below.

Figure 21:
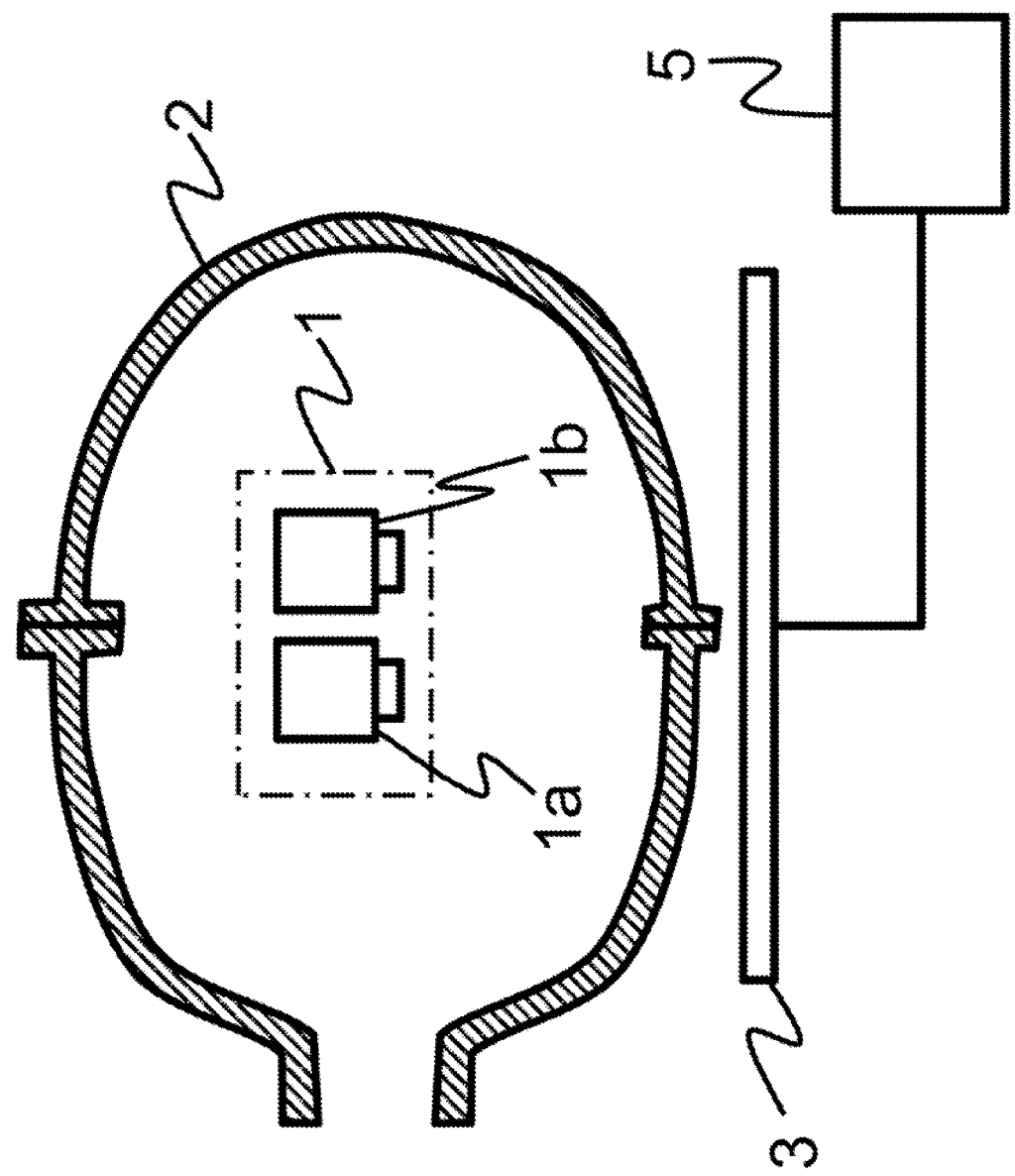
FIG. 21 is a schematic diagram for explaining another setup example 1 according to an embodiment of the present invention.

(1) A setup in which the X-ray emission means is located inside the structural member. A schematic diagram is shown in FIG. 21. To simplify the description, the multiple position distance measurement means 4 is not shown. This setup can be adopted when the X-ray emission means is small as compared with the opening of the structural member under inspection. In this setup, the emitted X-ray beams pass through only one layer of the structural member and accordingly suffer from less noise as compared with the case where the X-ray emission means 1 is located outside the structural member 2, thereby serving to realize a highly accurate inspection.

Figure 22:
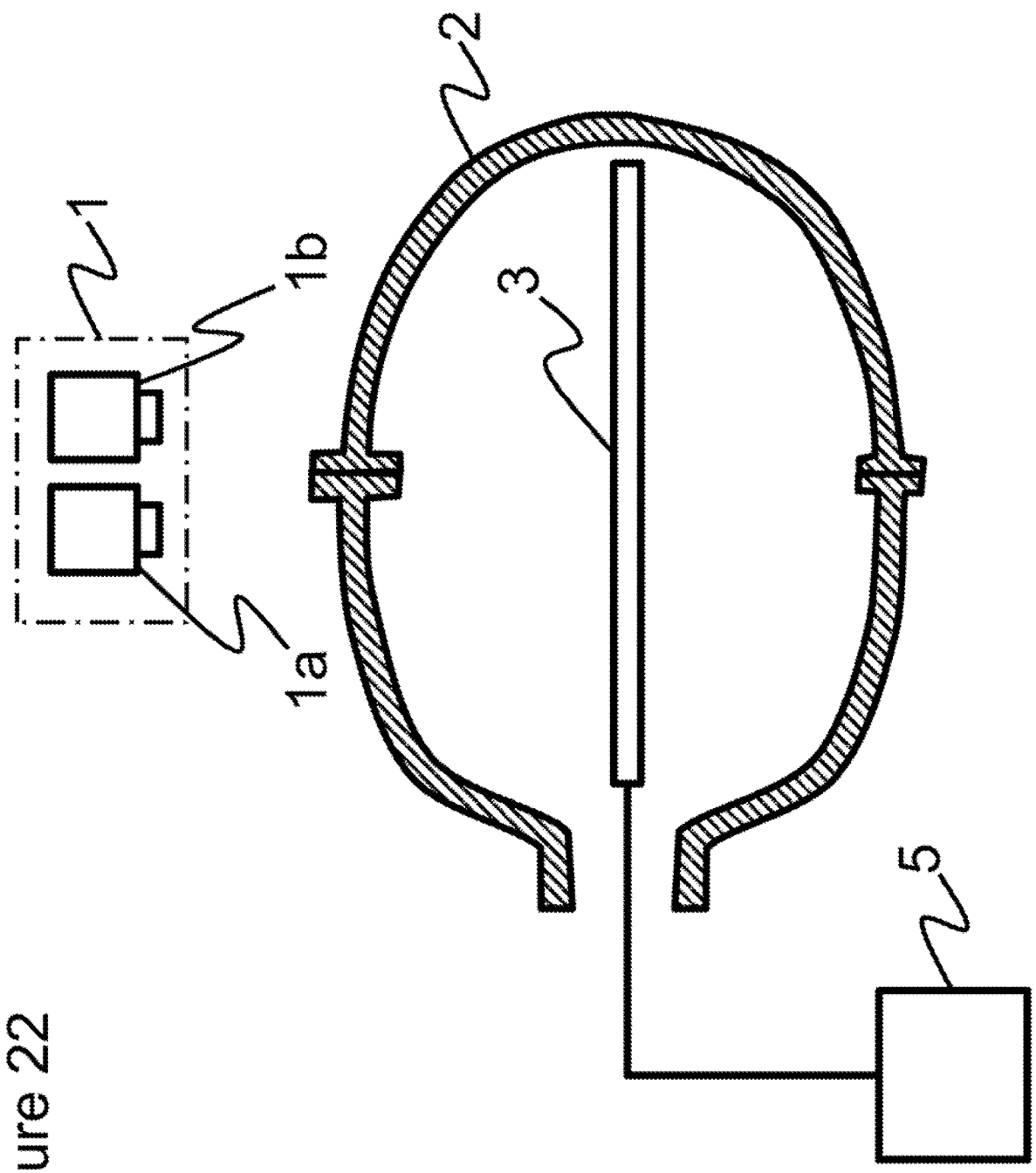
FIG. 22 is a schematic diagram for explaining another setup example 2 according to an embodiment of the present invention.
Figure 23:
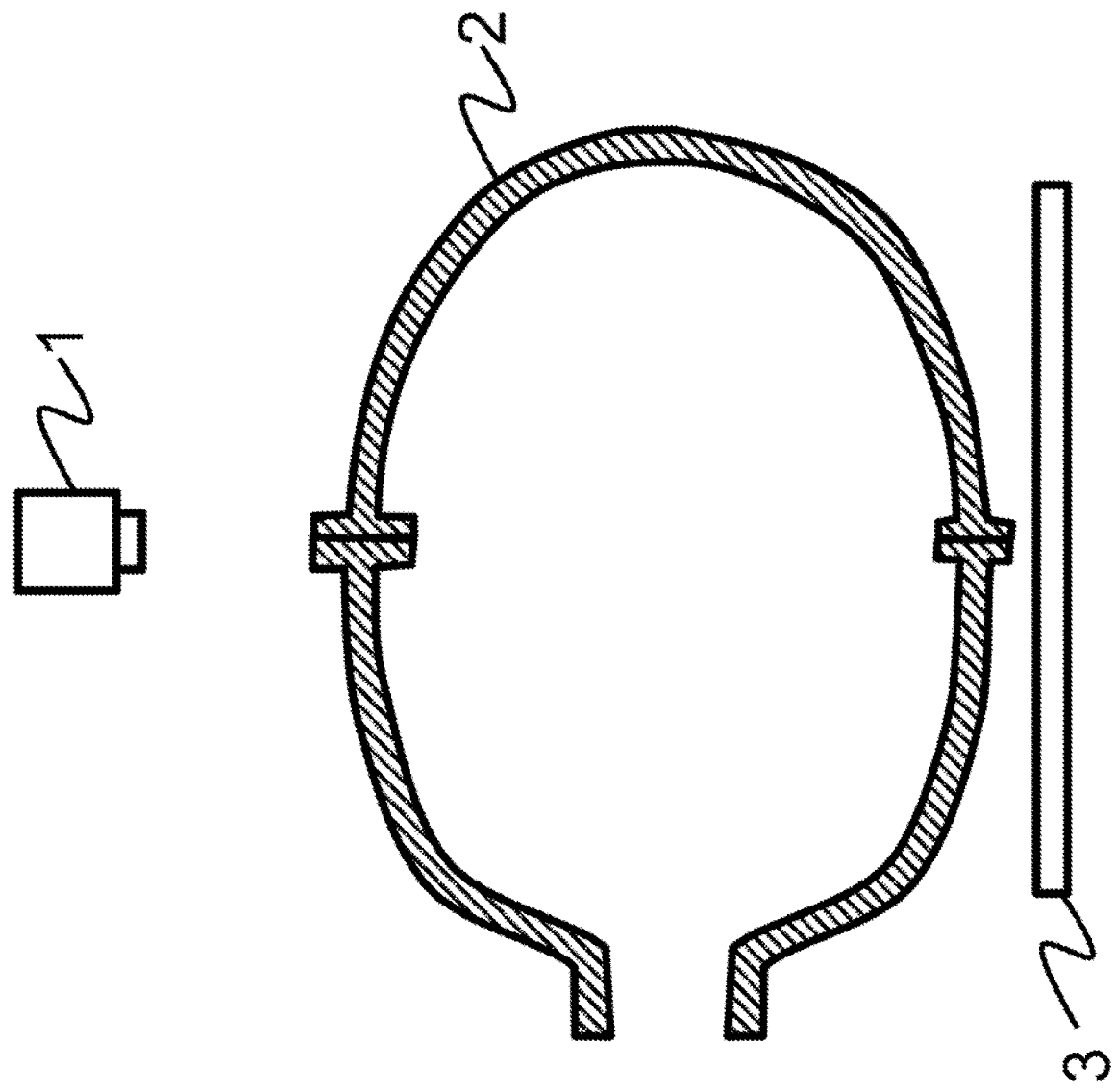
FIG. 23 is a schematic diagram for explaining a general type inspection setup based on X-ray transmission imaging.
Figure 24:
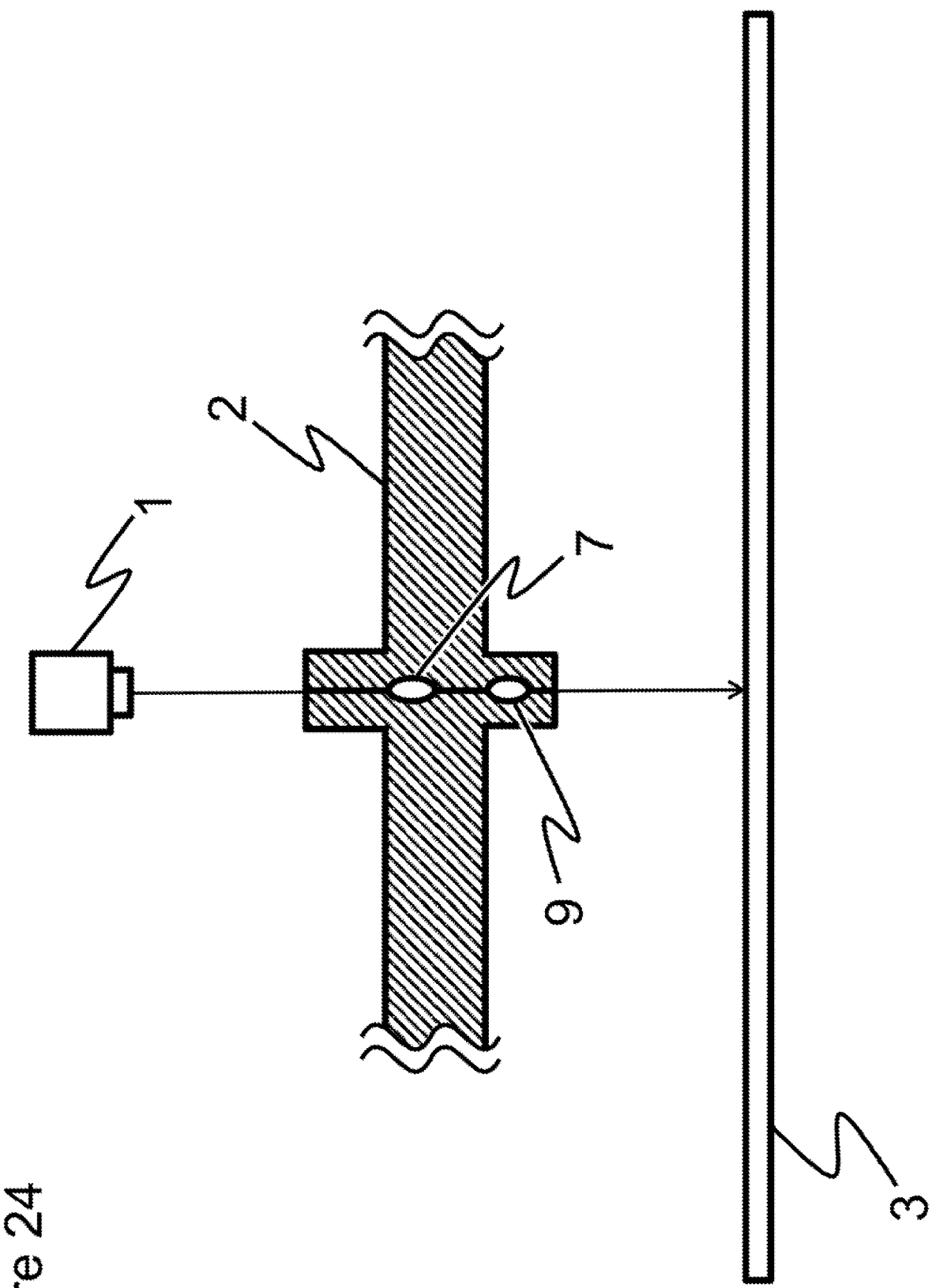
FIG. 24 is a schematic diagram for explaining a typical defect portion and a non-defect portion that cannot be distinguished by an inspection setup based on general type X-ray transmission imaging.

(2) A setup in which the X-ray detection means is located inside the structural member. A schematic diagram is shown in FIG. 22. To simplify the description, the multiple position distance measurement means 4 is not shown. This setup can be adopted when the X-ray detection means is small as compared with the opening of the structural member under inspection. In this setup as well, the emitted X-ray beams pass through only one layer of the structural member and accordingly suffer less noise as compared with the case where the X-ray detection means 3 is located outside the structural member 2, thereby serving to realize a highly accurate inspection.

<Structural Member Production Apparatus>

A production apparatus for structural members according to an embodiment of the present invention is described below. The production apparatus for structural members according to the present embodiment includes an inspection means containing the aforementioned inspection apparatus for structural members and a sorting means designed to distinguish between a structural member judged to be unacceptable and a structural member judged to be acceptable by the inspection means. It is described in detail below. The production apparatus for structural members according to the present embodiment is only required to include the inspection means and sorting means, and there are no specific limitations on the other means. Accordingly, such other means as described below are mere examples which may be modified appropriately.

(Structural Member Formation Means)

This means is a production means for structural members. For example, when the structural member is a liner member as described above, it can be formed by blow molding, injection molding, or the like that are described above in relation to the embodiment of an inspection apparatus for structural members.

(Inspection Means)

This means includes an X-ray emission means for emitting X-ray beams through two or more paths, at least one X-ray detection means for detecting X-ray beams that have passed through a structural member, and an image processing means. A structural member found by the inspection means to contain impurities, voids, or the like is judged to be unacceptable and removed by the subsequent sorting means.

(Sorting Means)

This means is intended for distinguishing between a structural member judged to be unacceptable and a structural member judged to be acceptable by the inspection means. This means may be implemented manually by a selector or implemented mechanically by a transport means that works in conjunction with a computer program that has information on acceptable or unacceptable ones. Acceptable structural members that are not rejected by the sorting means can be adapted as a material for high pressure tanks.

As described above, in the production method for structural members according to the present embodiment, the inspection means can serve for appropriately detecting impurities and voids present in a structural member. In addition, a structural member found to contain impurities or the like is rejected and removed in the sorting step. Accordingly, only acceptable structural members can be sorted out. A structural member thus sorted out will be subjected to subsequent steps to produce a high pressure tank. As a result, in the production method for structural members according to the present embodiment, the subsequent steps can be omitted for unacceptable structural members. Furthermore, this serves to increase the yield of high pressure tanks.

<Production Apparatus for High Pressure Tanks>

A production apparatus for high pressure tanks according to an embodiment of the present invention is described below. The production apparatus for high pressure tanks according to the present invention includes an inspection means containing the aforementioned inspection apparatus for structural members, a sorting means designed to distinguish between a structural member judged to be unacceptable and a structural member judged to be acceptable by the inspection means, and an outer layer formation means for forming an outer layer for reinforcement on the structural member judged to be acceptable. It is described in detail below. The production apparatus for high pressure tanks according to embodiments of the present invention are only required to include the inspection means, sorting means, and outer layer formation means, and there are no specific limitations on other means. Accordingly, such other means as described below are mere examples which may be modified appropriately.

(Structural Member Formation Means)

This means is a production means for structural members. For example, when the structural member is a liner member as described above, it can be formed by blow molding, injection molding, or the like that are described above in relation to the embodiment of an inspection apparatus for structural members.

(Inspection Means)

The means includes an X-ray emission means for emitting X-ray beams through two or more paths, at least one X-ray detection means for detecting X-ray beams that have passed through a structural member, and an image processing means, and therefore, is identical to the inspection means that is described above in relation to the embodiment of the production apparatus for structural members.

(Sorting Means)

This means is intended for distinguishing between a structural member judged to be unacceptable and a structural member judged to be acceptable by the inspection means, and therefore, is identical to the sorting means that is described above in relation to the embodiment of the production apparatus for structural members.

(Outer Layer Formation Means)

This means is intended to form a reinforcing outer layer (reinforcement layer) on a structural member judged to be acceptable. As described above in relation to the embodiment of the inspection apparatus, the reinforcement layer is preferably a fiber reinforced resin layer, and one or more reinforcement layers are formed on the outer surface of the structural member. The structural member having a reinforcement layer is further equipped with a supply line (valve members, various pipings, etc.) for supplying high pressure gas to a fuel cell as appropriate to serve as a high pressure tank.

As described above, in the production apparatus for high pressure tanks according to the present invention, the inspection apparatus can serve for appropriately detecting impurities and voids present in a structural member. In addition, the structural member is rejected and removed by the sorting means if it is found to contain impurities or the like. A reinforcement layer is formed on the structural member only when it is judged to be acceptable. Therefore, if the production apparatus for high pressure tanks according to an embodiment of the present invention is adopted, no reinforcement layer will be formed on a structural member judged to be unacceptable, thereby serving, for example, for avoiding the wasting of fiber reinforced resin. This also serves to increase the yield of high pressure tanks.

<Structural Member>

The structural member according to an embodiment of the present invention is described below. The structural member according to an embodiment of the present invention is produced by using a production apparatus for structural members as described above. It is described in detail below. The structural member according to embodiments of the present invention is only required to be a product produced by a production apparatus as described above, and there are no specific limitations on other means. Accordingly, such other means as described below are mere examples which may be modified appropriately.

<Production Apparatus for Structural Members>

This apparatus is a production apparatus for structural members. This is identical to the production apparatus for structural members described above.

As described above, if the structural member according to the present invention is adopted, the production apparatus can serve for appropriately detecting impurities and voids present in the structural member. In addition, the structural member is rejected and removed by the sorting means if it is found to contain impurities or the like. Therefore, if the structural members according to embodiments of the present invention is adopted, no reinforcement layer will be formed on the structural member after being judged to be unacceptable, thereby serving, for example, for avoiding the wasting of fiber reinforced resin. This also serves to increase the yield of high pressure tanks.

Thus, if the structural member according to embodiments of the present invention is adopted, it will be sorted out only when it is judged to be acceptable. The structural member thus sorted out will be subjected to subsequent steps to produce a high pressure tank. In this way, if the structural member according to the present invention is adopted, the subsequent steps can be omitted in the case where the structural member is judged to be unacceptable.

<High Pressure Tank>

A high pressure tank according to an embodiment of the present invention is described below. The high pressure tank according to the present invention is produced by using the aforementioned production apparatus for high pressure tanks. It is described in detail below. For the high pressure tank according to an embodiment of the present invention is only required to be a product produced by a production apparatus as described above, and there are no specific limitations on other means. Accordingly, such other means as described below are mere examples which may be modified appropriately.

(Production Apparatus for High Pressure Tanks)

This apparatus is a production apparatus for high pressure tanks. This is identical to the production apparatus for high pressure tanks described above.

Thus, if the high pressure tank according to an embodiment of the present invention is adopted, a reinforcement layer is formed only on a structural member judged to be acceptable. Therefore, in the case of the high pressure tank according to an embodiment of the present invention, no reinforcement layer will be formed on a structural member judged to be unacceptable, thereby serving, for example, for avoiding the wasting of fiber reinforced resin.

<Fuel Cell Vehicle>

A fuel cell vehicle according to an embodiment of the present invention is described below. The fuel cell vehicle according to an embodiment of the present invention uses a high pressure tank as described above. It is described in detail below. Here, the fuel cell vehicle according to an embodiment of the present invention is only required to use a high pressure tank as described above, and there are no specific limitations on other means. Accordingly, such other means as described below are mere examples which may be modified appropriately.

(High Pressure Tank)

This tank is a high pressure tank. This is identical to the high pressure tank described above.

Thus, when producing a fuel cell vehicle according to an embodiment of the present invention, a reinforcement layer is formed only on a structural member judged to be acceptable and only a high pressure tank produced thereof is used. Therefore, when producing a fuel cell vehicle according to embodiments of the present invention, the use of an unacceptable high pressure tank is prevented, thereby serving, for example, for avoiding the wasting of other members for the fuel cell vehicle.

EXPLANATION OF NUMERALS

X-ray emission means
1a X-ray emission means
1b X-ray emission means
2 structural member
3 X-ray detection means
4 multiple position distance measurement means
4a distance measurement position
5 image processing means
7 void defect in joint portion
8 overlooked void defect in joint portion
9 void defect in fin
10a X-ray detection image a corresponding to X-ray emission means 1a
10b X-ray detection image b corresponding to X-ray emission means 1b
11 misdetection region
12 defect candidate image
13 stereo matching image
14 height position calculation image
15 set outside inspection region boundary threshold
16 set inside inspection region boundary threshold
17 actual outside inspection region boundary
18 actual inside inspection region boundary
10 misdetected void it fin
20 multiple position distance measuring data
21 outside inspection region boundary image
22 inside inspection region boundary image
23 defect sorting result image

The invention claimed is:

1. An inspection apparatus for structural members comprising an X-ray emission means for emitting X-ray beams through two or more paths, one or more X-ray detection means for detecting X-ray beams that have passed through a structural member, a multiple position distance measurement means for measuring the distance from the X-ray emission means to the structural member at a plurality of positions, and an image processing means, wherein
the image processing means comprises a defect candidate detection means for detecting a defect candidate based on two or more images acquired by the X-ray detection means, a height measurement means, an image computation means for performing logical multiplication of the image having recorded height position information obtained by the height measurement means and a defect candidate image obtained by the defect candidate detection means, an inspection region setting means for setting an inspection region based on the distance and the thickness of the structural member, and a defect identification means for identifying a defect when the inspection region contains a defect candidate.

2. An inspection apparatus for structural members as set forth in claim 1, wherein the multiple position distance measurement means is a height profile measurement means for measuring the linear height profile by the optical cutting method.

3. An inspection apparatus for structural members as set forth in claim 1, wherein the height measurement means is a stereo matching type one.

4. An inspection apparatus for structural members as set forth in claim 1, wherein the inspection region setting means is designed to determine the surface profile of the structural member from the plurality of distance values and set an inspection region at each inspection position on the basis of the thickness of the structural member.

5. An inspection apparatus for structural members as set forth in claim 1, wherein the structural member has a substantially tubular shape having a surface profile as estimated from the center position and the radius of the arc of the structural member calculated from the plurality of distance values.

6. An inspection apparatus for structural members as set forth in claim 1, wherein the structural member is a member of a high pressure tank.

7. A production apparatus for structural members having an inspection apparatus for structural members as set forth in claim 1 and comprising an inspection means having an inspection apparatus for structural members and a sorting means for distinguishing between a structural member judged to be unacceptable and a structural member judged to be acceptable by the inspection means.

8. A structural member produced by using a production apparatus for structural members as set forth in claim 7.

9. A production apparatus for high pressure tanks having an inspection apparatus for structural members as set forth in claim 1 and comprising an inspection means having an inspection apparatus for structural members, a sorting means for distinguishing between a structural member judged to be unacceptable and a structural members judged to be acceptable by the inspection means, and an outer layer formation means for forming an outer layer for reinforcement on the structural member judged to be acceptable.

10. A high pressure tank produced by using a production apparatus for high pressure tanks as set forth in claim 8.

11. A fuel cell vehicle having a high pressure tank as set forth in claim 10.

12. An inspection method for structural members characterized by emitting X-ray beams through two or more paths, detecting X-ray beams that have passed through a structural member at one or more positions, measuring the distance from the X-ray emission means to the structural member at a plurality of positions, detecting a defect candidate based on observed X-ray images, measuring the height of the defect candidate, performing logical multiplication of the observed height information image and the image obtained as defect candidate, setting an inspection region based on the distance and the thickness of the structural member, and identifying a defect when the inspection region contains a defect candidate.

13. An inspection method for structural members as set forth in claim 12, wherein the method for measuring the distance is designed to measure the linear height profile by the optical cutting method.

14. An inspection method for structural members as set forth in claim 12, wherein the method for measuring the height of a defect candidate is a stereo matching type one.

15. An inspection method for structural members as set forth in claim 12, wherein the inspection region setting means is designed to determine the surface profile of the structural member from the plurality of distance values and set an inspection region at each inspection position on the basis of the thickness of the structural member.

16. An inspection method for structural members as set forth in claim 12, wherein the structural member has a substantially tubular shape and the surface profile thereof is estimated from the center position and the radius of the arc of the structural member calculated from the plurality of distance values.

17. An inspection method for structural members as set forth in claim 12, wherein the structural member is a member of a high pressure tank.

18. A production method for structural members using an inspection method for structural members as set forth in claim 12 and comprising an inspection step that uses the inspection method for structural members and a sorting step for distinguishing between a structural member judged to be unacceptable and a structural member judged to be acceptable in the inspection step.

19. A production method for high pressure tanks using an inspection method for structural members as set forth in claim 12 and comprising an inspection step using the inspection method for structural members, a sorting step for distinguishing between a structural member judged to be unacceptable and a structural member judged to be acceptable in the inspection step, and an outer layer forming step for forming an outer layer for reinforcement on the structural member judged to be acceptable.

20. A production method for fuel cell vehicles using a inspection method for structural members as set forth in claim 12 and comprising an inspection step using the inspection method for structural members, a sorting step for distinguishing between a structural member judged to be unacceptable and a structural member judged to be acceptable in the inspection step, an outer layer forming step for forming an outer layer for reinforcement on the structural member judged to be acceptable in order to provide a high pressure tank, and an installation step for installing the resulting high pressure tank on a chassis.

* * * * *